US012078193B2

(12) United States Patent
Helgerson et al.

(10) Patent No.: US 12,078,193 B2
(45) Date of Patent: Sep. 3, 2024

(54) DISPLACEMENT POWER CONTROLLERS AND APPLICATIONS

(71) Applicant: Perisseuma Technologies LLC, Krum, TX (US)

(72) Inventors: Daniel S Helgerson, Wolfeboro Falls, NH (US); Michael Joe Lewis, Oklahoma City, OK (US)

(73) Assignee: Perisseuma Technologies LLC, Edmond, OK (US)

( * ) Notice: Subject to any disclaimer, the term of this patent is extended or adjusted under 35 U.S.C. 154(b) by 0 days.

(21) Appl. No.: 18/113,575

(22) Filed: Feb. 23, 2023

(65) Prior Publication Data

US 2023/0375011 A1 Nov. 23, 2023

Related U.S. Application Data

(60) Provisional application No. 63/312,922, filed on Feb. 23, 2022.

(51) Int. Cl.

| | |
|---|---|
| ***F15B 11/032*** | (2006.01) |
| ***F01C 1/356*** | (2006.01) |
| ***F15B 11/076*** | (2006.01) |
| ***F15B 21/00*** | (2006.01) |

(52) U.S. Cl.
CPC .......... *F15B 11/032* (2013.01); *F01C 1/3568* (2013.01); *F15B 11/076* (2013.01); *F15B 21/00* (2013.01)

(58) Field of Classification Search
CPC ........ F01C 1/3568; F01C 20/22; F01C 1/344; F15B 11/032; F15B 11/076
See application file for complete search history.

(56) References Cited

U.S. PATENT DOCUMENTS

| | | | |
|---|---|---|---|
| 4,932,843 A | 6/1990 | Itoigawa | |
| 5,135,031 A | 8/1992 | Burgess | |
| 6,385,979 B2 | 5/2002 | Ota et al. | |
| 6,497,558 B1 | 12/2002 | Hale | |
| 6,887,045 B2 | 5/2005 | Schaeffer | |
| 9,222,527 B2 | 12/2015 | Stromotich | |
| 9,816,498 B2 | 11/2017 | Suzuki et al. | |
| 9,896,935 B2 * | 2/2018 | Prigent | F03C 1/0478 |
| 2006/0051223 A1 | 3/2006 | Mark | |
| 2009/0202375 A1 * | 8/2009 | Shulver | F01M 1/16 418/26 |

FOREIGN PATENT DOCUMENTS

| | | |
|---|---|---|
| AU | 2011201454 A1 | 3/2021 |
| CA | 2726287 A1 | 12/2009 |

(Continued)

OTHER PUBLICATIONS

Presentation to IFPE 2023, Las Vegas, NV, USA on Mar. 14-28, 2023.

(Continued)

*Primary Examiner* — Abiy Teka
(74) *Attorney, Agent, or Firm* — Brian C. McCormack

(57) ABSTRACT

Disclosed are Variable Displacement Power Controllers and applications generally in the field of fluid powered systems that provide for increased efficiency and effectiveness over known fluid systems, where fluid power generally refers to hydraulic or pneumatic power systems.

19 Claims, 33 Drawing Sheets

(56) References Cited

FOREIGN PATENT DOCUMENTS

| | | | |
|---|---|---|---|
| CN | 101398018 | B | 8/2010 |
| DE | 102008060596 | A1 | 6/2010 |
| DE | 10037114 | B4 | 7/2010 |
| EP | 1172553 | A2 | 6/2001 |
| WO | 9961306 | A1 | 12/1999 |
| WO | 9961798 | A1 | 12/1999 |

OTHER PUBLICATIONS

Article in Fluid Power Journal, Sep. 2019—www.fluidpowerjournal.com.

* cited by examiner

DISPLACEMENT POWER CONTROLLERS AND APPLICATIONS

CROSS-REFERENCE TO RELATED APPLICATIONS

The present application is a non-provisional patent application from and claims priority to U.S. Provisional Patent Application No. 63/312,922, the contents of which are incorporated herein in their entirety.

BACKGROUND

In describing power controllers, it is helpful to consider some terms relative to the fluid power industry, some of which are familiar and some of which will be new. These terms are defined below and will be used throughout this document.

Unit of energy ($U_E$): a unit volume of fluid charged to unit pressure.
- unit volume=mm$^3$, cm$^3$, in$^3$
- unit pressure=MPa, psi Unit of power ($U_P$): a unit flow rate at unit pressure.
- unit flow rate=lpm, gpm
- unit pressure=MPa, psi Potential energy ($P_E$): total volume at unit pressure.
- total volume=mm$^3$, in$^3$
- unit pressure=MPa, psi Unit of work ($U_W$): a unit of effort at unit distance.
- unit effort=lb$_f$, N
- unit distance=mm, in Unit of force ($U_F$): a unit pressure times unit area.
- unit pressure=MPa, psi
- unit area=mm$^2$, in$^2$ In most fluid power systems, there is more energy available than is needed to do the work. When this energy is stored (potential energy), there is no waste. But when excess energy is directed to an actuator, it produces acceleration to a higher velocity than is desired. The extra energy must be neutralized, either before the actuator (meter-in) or after the actuator (meter-out). It is this characteristic of energy transfer with fluids that results in much of the energy loss in fluid power systems.

A fixed displacement pump operating at a specific rpm will produce a relatively constant flow. Resistance to that flow will cause the pump to charge each unit volume with the pressure necessary to push it out. This pump has a fixed flow and a variable pressure.

Hydraulic systems that use a fixed displacement pump to push UE's to an actuator may be designed to be relatively efficient when the actuator uses all the UE's coming from the pump. The losses would be from the inefficiency of the components and pressure losses through the conductors, but there would be no adjustment of the actuator velocity.

When it is necessary to have velocity control, inefficiency increases. The fixed displacement pump must be sized to provide enough flow for the maximum velocity and the prime mover must be sized to drive the pump at the maximum pressure. This means that there are times when more power is being put into the system than is needed. All the UEs leaving the pump will be charged with enough pressure to move the load but not all the UE's will be used. The unused UE's will be diverted back to the reservoir at low pressure. Whenever a pressurized UE is directed to an area of lower pressure without doing work, there is an energy transfer in the form of heat. With pneumatics, this is an endothermic transfer. With hydraulics, this is an exothermic transfer.

To save energy, variable displacement, pressure compensated pumps have been developed. They provide a variable flow at a fixed pressure. These pumps change displacement so that the UE flow matches the velocity requirements, but at maximum pressure. The UE's leaving the pump each have a higher energy level than is needed. The volume of fluid is needed to move the actuator but at a lower energy level to prevent too much acceleration. The flow rate of UE's must not change but each UE must reduce its charge of pressure. This is accomplished by means of an orifice. It takes energy to squeeze UE's through an orifice. The energy is consumed as a pressure loss and is dissipated as heat. The UE's downstream of the orifice have a lower energy density than the UE's entering the orifice. The volume of fluid did not change but the power level was reduced. The pressure compensated pump is an improvement over the fixed displacement system. Power control with fixed displacement is a waste of both volume and pressure. Pressure compensated systems reduce the waste of volume and only waste the energy derived from pressure.

Another prior art improvement was made with the development of the load-sensing pump. This pump limits both the flow and pressure to match the power (velocity) requirements of the actuator. The load-sensing pump maintains a pressure that is about 10% higher than the load-induced pressure, so it still requires a restrictive orifice to squeeze off extra energy. When used in a system where there is more than one actuator, the load-sensing pump maintains a pressure that is about 10% higher than the highest pressure requirement. This can dramatically increase the energy loss. It is an improvement over the pressure compensated pump but both use orifices to consume excess energy.

Some prior art systems address the limitations of the load-sensing pump by supplying a single load-sensing pump for each actuator. This has drawbacks. It increases cost, increases plumbing, increases weight, and takes up a lot of space. In addition, each pump still has at least a 10% energy loss through a restrictive orifice.

A common approach in the prior art to deal with to the problem of efficiency is the use of variable speed electric motors. Using fixed displacement pumps, these motors adjust their speed to provide the actuators with the correct flow with pressure determined by the resistance. The limitations of these systems are that they are not able to accommodate the specific needs of more than one actuator at a time, the motors must be sized for maximum load, they make no provision for storing energy, and the controls require electronic equipment that add cost and take up space.

With improvements in electrohydraulic equipment, some manufacturers are offering actuators with attached hydraulic power units. Each self-contained power unit has a variable speed motor attached to a fixed displacement pump. The motor rpm determines flow rate, and the resistance determines the pressure. The limitations are that the actuators must be modified to accept the mounted power units, there is a substantial increase in installed cost, they are not practical as a retrofit to existing systems, and there is no provision for energy storage.

The Digital Displacement® pump was developed to match the power requirements to one or several actuators. It has some remarkable characteristics, but it can only be controlled by a computer. It has no value in the storage and controlled release of UE's.

BRIEF SUMMARY

A known advantage of fluid power, both hydraulic and pneumatic, is the ability to store energy. A system can be analyzed to determine the average power requirement and then a power unit can be made that will supply an average flow rate. When the demand is less than the average suppled flow, the extra UE's are stored in an accumulator (hydraulic) or a receiver (pneumatic). Then when demand is higher than the average, UE's are drawn from storage. This type of system usually saves energy, but in current implementations in the industry there are inherent inefficiencies. For the stored energy to be used, the UE's must be at a higher energy level than is required by the load. As with the devices described above, the excess energy in the UE's must be reduced as they are squeezed through an orifice. The energy is lost as heat.

When a load has been lifted by an actuator, it has potential energy ($P_E$). When the load is lowered, the $P_E$ becomes KE in the fluid and the energy is drained away to the reservoir (hydraulic) or to atmosphere (pneumatic). Whether the descent is controlled or allowed to free-fall, all the energy used to raise the load is dissipated as heat passing through an orifice, or as a shock wave as the load strikes the bottom. The common method in hydraulics is to use a counterbalance valve for a controlled descent. This is a modulating orifice that dissipates the energy as heat. With pneumatics, an orifice is placed in the line that dissipates the energy by taking on heat. In either case, it is analogous to using the brake as a car goes downhill.

All the prior-art systems described have one thing in common. They all control power by reducing the amount of energy in the UE's from the source by transferring the energy in the form of heat.

BRIEF DESCRIPTION OF THE DRAWINGS

Reference is now made to the following detailed description of the preferred embodiments, taken in conjunction with the accompanying drawings. It is emphasized that various features may not be drawn to scale. In fact, the dimensions of various features may be arbitrarily increased or reduced for clarity of discussion. In addition, it is emphasized that some components be omitted in certain figures for clarity of discussion. Reference is now made to the following descriptions taken in conjunction with the accompanying drawings, in which.

Although similar reference numbers may be used to refer to similar elements for convenience, it can be appreciated that each of the various example embodiments may be considered distinct variations.

DETAILED DESCRIPTION

Figure 1:
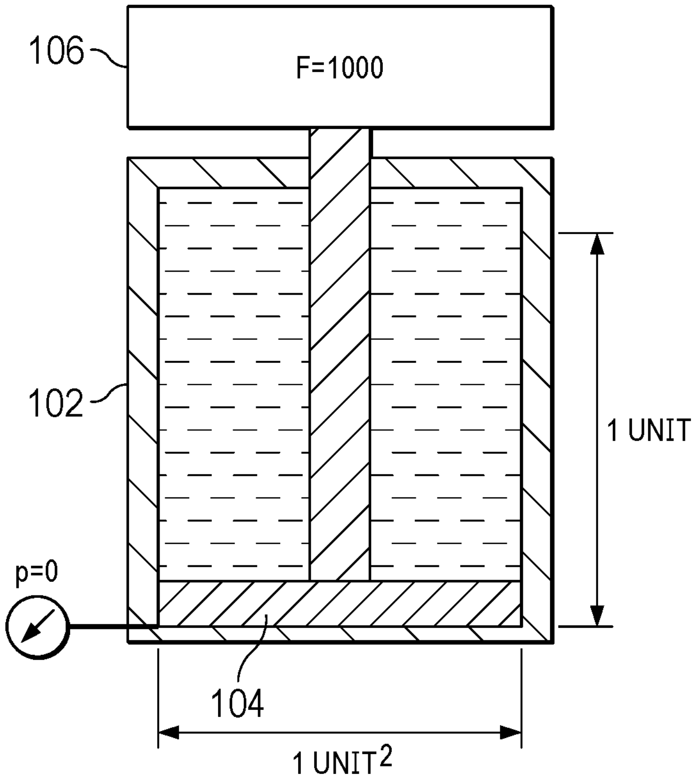
FIG. 1 (PRIOR ART)
FIG. 1 is a block diagram of a prior art cylinder illustrating a unit of work in a hydraulic/pneumatic system.
Figure 2:
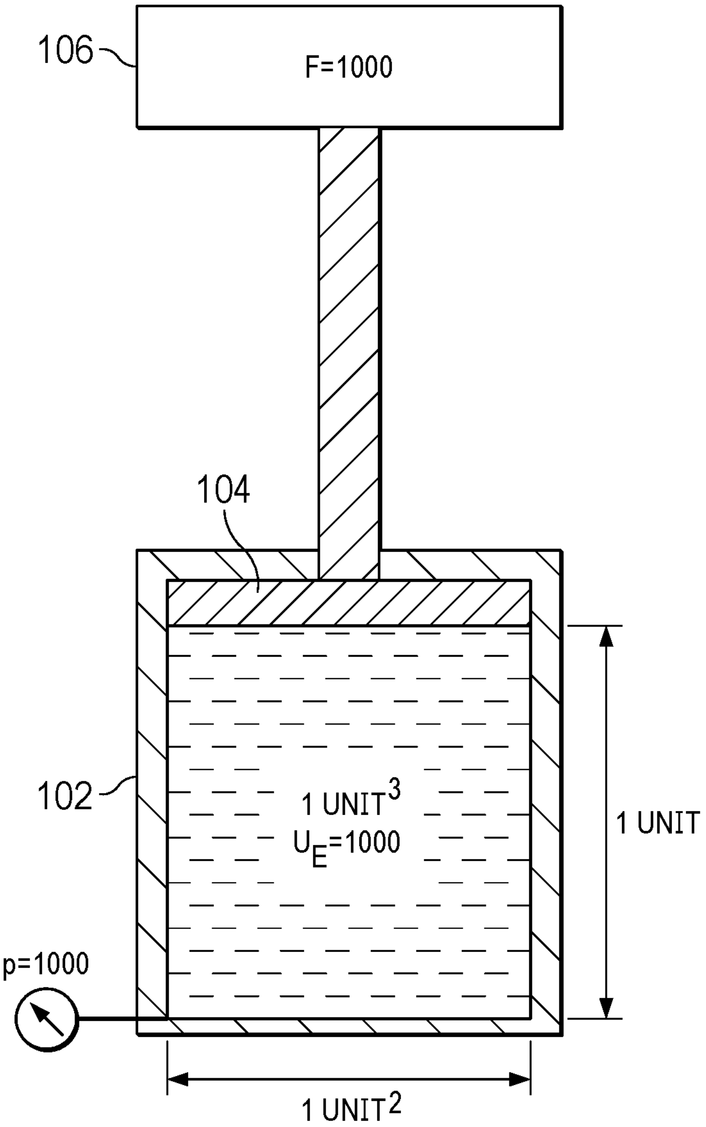
FIG. 2 (PRIOR ART)
FIG. 2 is the prior art embodiment of FIG. 1 in which a force has been expended in order to achieve one unit of work.

In FIG. 1 a cylinder 102 supports a force or load 106 of 1,000 on a piston 104 with an area of 1 unit$^2$ and a stroke of 1 unit. To fully extend the load 106 will require 1 unit$^3$ at a pressure of 1,000. Once extended, the UE under the piston will be Force divided by volume (F/V) or 1,000/1. UE=1,000. (See FIG. 2) This will require 1 UE with a pressure of 1,000 to lift the load, i.e., 1 unit of work.

Figure 3:
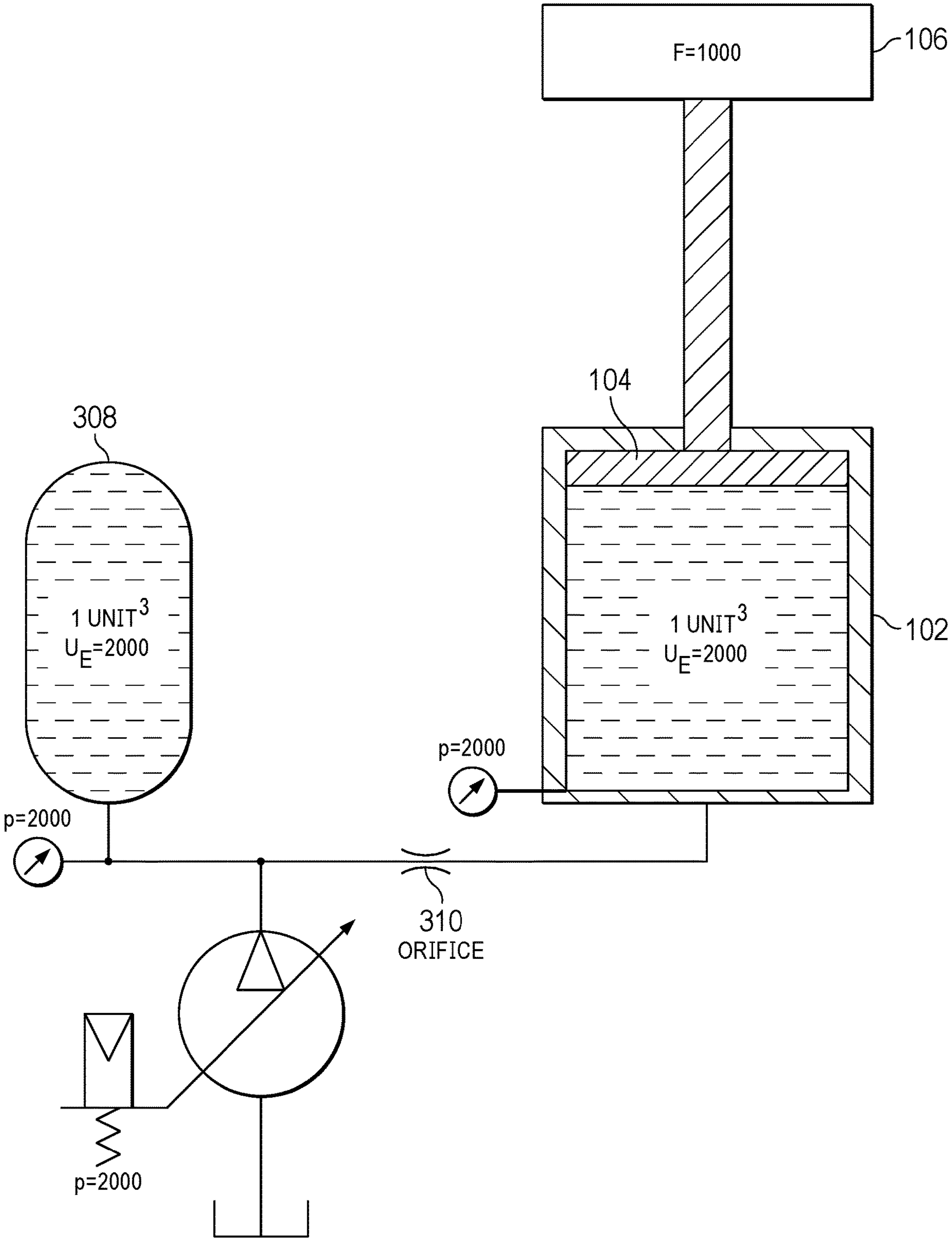
FIG. 3 (PRIOR ART)
FIG. 3 is a prior art embodiment in which excess energy must be expended through an orifice.

In FIG. 3 the source energy 308 from either a pump or an accumulator is supplied at 2,000 pressure units so each $U_E$ has a $P_E$ of 2,000. Velocity control is gained by adding an orifice 310 between the source 308 and the actuator 102/104 to dissipate the extra energy as heat. This orifice could be in the form of a needle valve, a pressure reducing valve, a pressure compensated flow control, or a proportional directional valve, but it is still just an orifice.

Once the piston/cylinder actuator 102/104 reaches the end of its stroke, the Δp would be zero and the pressure in the cylinder 102 would rise to the level of the source pressure. The power was controlled, but twice the amount of energy was used as was necessary. When the piston 104 completely extends, the pressure will rise to that of the source and produce twice the necessary force.

Figure 4:
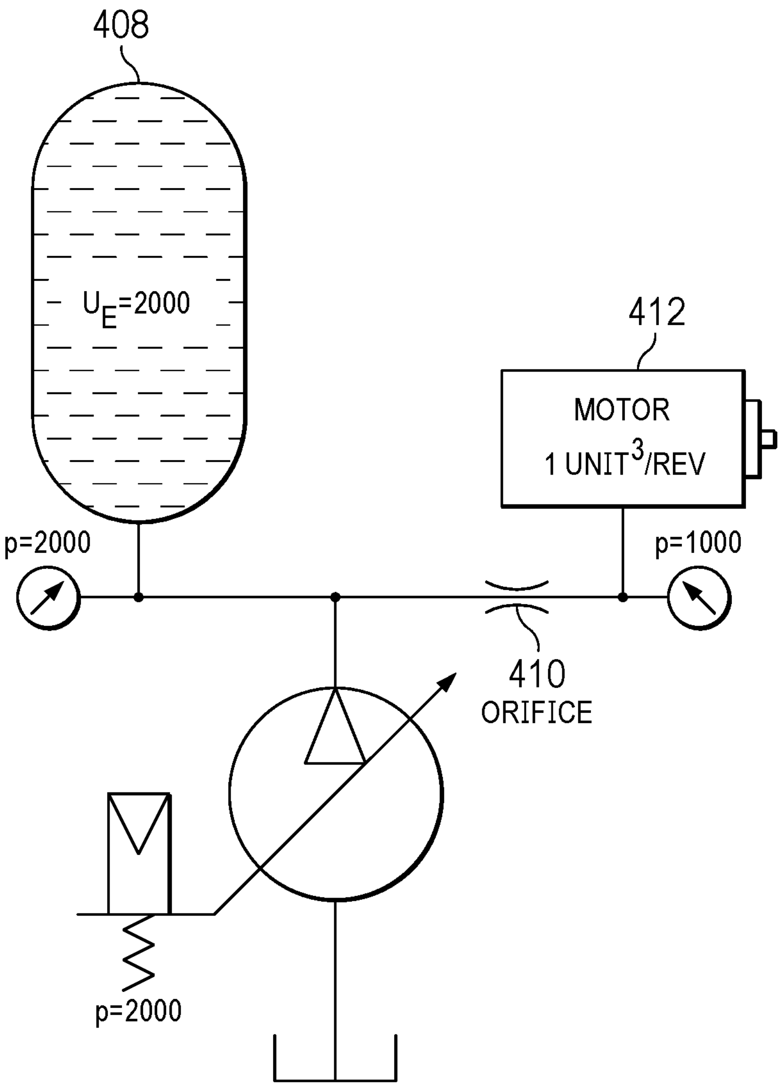
FIG. 4 (PRIOR ART)
FIG. 4 is a prior art embodiment in which a motor is driven but excess energy must be expended through an orifice.

FIG. 4 shows a prior art implementation using a source 408 and orifice 410, but operating a motor at a controlled speed. The extra energy is continually squeezed off by the orifice 410. The motor 412 operates at the correct velocity, but the system consumes twice as much energy as is required.

The Variable Displacement Power Controller (VDPC) embodiments disclosed in the present application are different from the prior art approaches described above. The VDPC embodiments do not reduce the energy in the UE's but instead can be used to reconfigure or distribute the energy to provide improved efficiency and flexibility in their implementations.

The concept of the Variable Displacement Power Control (VDPC) is to recognize fluid energy as a product of pressure and volume (pV). The amount of energy stored as potential energy (PE) or used as kinetic energy (KE) can be expressed as energy units (UE's). The available energy can be in the form of high pressure/low volume UE's or low pressure/high volume UE's. VDPCs make it possible to produce the energy in the most practical and efficient way and then convert or reconfigure the UE's to whatever is needed for the work to be done. When the UE's are stored or supplied at a pressure higher than is required by the load, the VDPC will reconfigure them into a lower pressure and increased volume. When the UE's exist at a pressure that is lower than what is required by the load, a VDPC will increase the pressure and reduce the volume. This provides the opportunity to produce energy at the most efficient level and then convert the energy into the most efficient form required for the work.

The VDPC embodiments described in the present patent application consider the total energy required for the work, designs for the most appropriate method of producing that energy, and then distributes the energy with an improved efficiency as described herein.

As will be further described in the embodiments below, the VDPC embodiments of the present application comprise rotating members encasing vanes, pistons, gears or other positioning/tensioning elements that travel around the inside of a cam ring having multiple lobes. This arrangement produces distinct displacement chambers, each of which may be pressurized and each of which has a port out of the VDPC. The cam ring and the rotating group comprising the rotating members and encased vanes or pistons are movable relative to each other to alter the ratio of displacements among the chambers.

Figure 5:
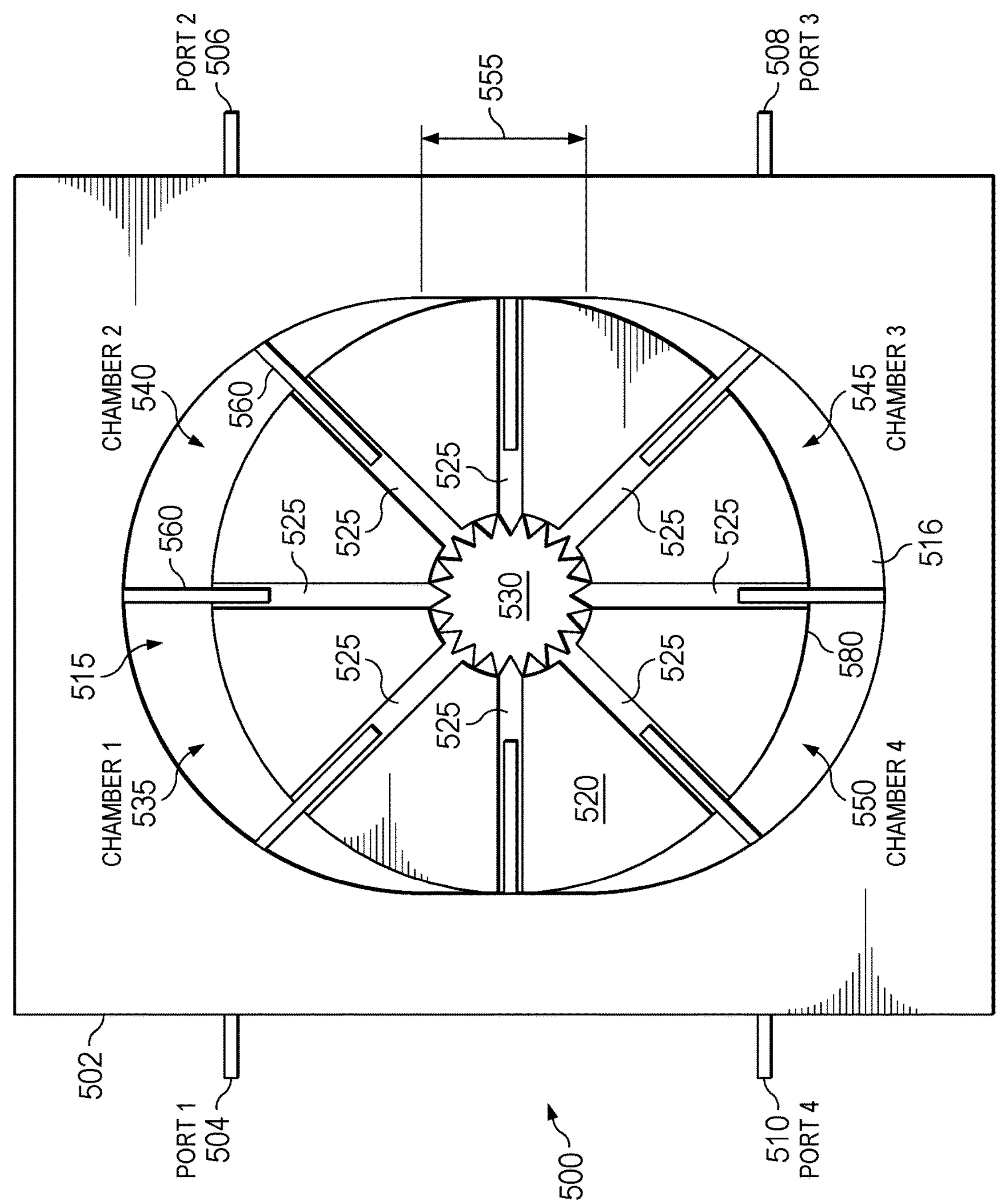
FIG. 5 is an embodiment of the present application in which a 4-port variable displacement power controller (VDPC) is adaptively controlled through the movement of a rotor relative to a cam.

For exemplary purposes, the operation of an embodiment of a VDPC is described below in the context of FIG. 5, although the operations can be understood by one of ordinary skill in the art as being applicable to the operation of other embodiments disclosed herein. Provided in the exemplary FIG. 5 is a VDPC comprising a housing/cam 502 with at least a first port ("Port 1") 504, a second port ("Port 2") 506, a third port ("Port 3") 508, and a fourth port ("Port 4) 510. Within the housing 502 are defined power exchange cavities 515 and 516 in fluid communication in which cavity 515 contains Chamber 1 535 which is connected to Port 1 504 and Chamber 2 540 which is connected to Port 2 506 and cavity 516 contains Chamber 3 545 which is connected to Port 3 508 and Chamber 4 550 which is connected to Port 4 510. A cam 502 is adjustably positioned in the power exchange cavities 515 and 516 and comprises an axis of rotation and a shaft 530.

Still referring to FIG. 5, the rotor 520 defines a first chamber 535, a second chamber 540, and third chamber 545, and a fourth chamber 550 within the PEC 515 and 516, the relative sizes of the chambers being defined by the relative position of the cam 502 within the power exchange cavity 515 and 516. In the embodiment of FIG. 5, the power exchange cavity 515 and 516 are shown as being an oblong shape with a straight-wall section 555 that defines the path of the relative movement between the cam 502 to the rotor 520. In a described embodiment, the rotor 520 is substantially circular having a certain rotor radius and the opposing ends of the power exchange cavity 515 and 516 have cavity radiuses, where the cavity radiuses may be larger or smaller than the rotor radius. In an embodiment, the translational movement of the rotor 520 along the straight-wall section 555 is limited such that chambers 535, 540, 545, 550 remain even when the rotor's 520 position is at either extreme end of the straight-wall section.

With further reference to FIG. 5, within the vane cavities 525 are a plurality of vanes 560 that further define the movement of fluid from one chamber to another according to the rotational movement of the cam/rotor/vane movement group 580. As an example, fluid flow entering Port 1 and passing into Chamber 1 produces a flow out of Chamber 2. And further, flow into Chamber 3 produces a flow out of Chamber 4, and so on, depending on the number of lobes and chambers. Flow can also be reversed through the VDPC.

Pressurized fluid entering any chamber induces a torque on the rotating group 580, which is distributed to the vanes 560 or pistons (in other embodiments pistons are used in the place of the vanes illustrated in the current embodiment). It is the common torque on the rotating member group 580 that enables UE's to be reconfigured.

A UE is a product of force and a unit volume (F/V), i.e., $N/mm^3$ or $lb./in^3$. It is a unit of work, either kinetic or potential. For example, 1000 pressure units acting on 1 unit volume contain the same amount of energy as 100 pressure units acting on 10-unit volumes. 1000F×1V=100F×10V. UE's flowing at a certain rate are simply units of work that occur over a certain amount of time, in other words, Units of Power (UP).

A certain volume at a certain flow rate is necessary to move an actuator in a certain amount of time. In the prior art, the source volume/flow rate is considered mandatory, leaving only pressure reduction as the means of velocity (power) control. The use of the VDPC makes it possible to reconfigure the source volume/flow and pressure (UE's and UP's) to match the velocity requirements of the actuator without the pressure reduction and consequent energy loss.

For illustration purposes, consider the arrangement of a VDPC 500 with its rotor 520 positioned at the center of the oblong power exchange cavity 515, such as being fixed at the halfway point of the straight-wall section 555. Further in this illustrative configuration, configuring the application to have pressurized UE's entering at Port 1 with Port 3 connected to a reservoir (not shown, see, e.g., FIG. 7). The torque on the rotor 520 that is produced by the entering UE's rotates the entire group 580. This causes Chamber 3 to have an increasing volume, receiving fluid from the reservoir through Port 3. In the center condition, each UE that enters Port 1 causes an equal volume to be received from the reservoir at Port 3. The output volume at Port 2 will be the same as the input volume at Port 1. The output volume at Port 4 will be the same as the input volume to Port 3. The total output volume from Ports 2 and 4 will be twice that of the input volume at Port 1. The power transmitted to the rotating member 580 that was derived from the UE's entering Port 1 will now be used to push out twice as much volume but at half the pressure. A UE at a pressure of 1,000 that enters at Port 1, leaves the VDPC as 2 UE's at a pressure of 500. The energy entering the VDPC will be the same as the energy leaving, only reconfigured to a higher volume at a lower pressure.

The VDPC can also reconfigure a UE into a higher pressure, reduced volume. Again, for purposes of illustration placing the rotating member 580 at the center of the oblong power exchange 515 and 516, by arranging the device so that Port 1 and Port 3 are both connected to the source at 1,000 pressure units and Port 2 is directed to the reservoir, a UE entering Port 1 at 1,000 units will be reconfigured as 0.5 UE's at 2,000 pressure units as it leaves Port 4. The output from Port 4 will be half the volume at twice the pressure.

The VDPC can also be used as an adjustable proportional power divider when it is desired to synchronize actuators. For example, in a four-chambered VDPC as described above, if the flow to Port 1 and Port 3 is from the same source, the output flow at Port 2 and Port 4 will be equal even if the pressure is different at each port. The input pressure will be the average of the output pressures. The DPC reconfigures the input UE's into what is required at each outlet. This embodiment does not provide velocity control, but power proportioning.

The VDPC can also be used as a disproportionate power divider to operate two actuators at different relative speeds. Given two motors of equal displacement where one is to operate at 1800 rpm and the other to operate at 900 rpm. The VDPC 500 would be arranged with the rotating group 580 moved within the oblong chamber 515 and 516 toward Chambers 3 and 4. The common input to Ports 1 and 3 could be divided, e.g., so that twice as much flow would go to Port 2 as would go to Port 4.

Whether used as a proportionate or disproportionate power divider, when the actuators are reversed, the VDPC will combine the flows from the actuators in the same ratio as it divided.

The Velocity Equations for Disclosed Embodiments

| $N = PK/(pd)$ for fluid motors | $V = P/(d^2pK)$ for cylinders. |
|---|---|
| N = rpm (linear velocity) | V = Velocity (in/sec or m/sec) |
| P = Power (kW or hp) | P = Power (kW or hp) |
| K = a constant to convert to metric or US Customary | d = diameter (in or mm) |
| p = pressure (MPa or psi) | p = pressure (MPa or psi) |
| d = displacement ($cm^3$ or $in^3$) | K = a constant to convert to metric or US Customary |

As seen in these equations, for any given power and velocity (P and N or P and V), there is a distinct product of pressure and displacement (pd) or pressure and diameter$^2$ ($pd^2$). When an actuator has a fixed displacement, the only variable is the pressure. And so, with a fixed displacement motor or a cylinder, velocity, linear or angular, is determined by the amount of available pressure differential. The VDPC modulates the power going to an actuator by reconfiguring the input UE's to match the pressure for the target velocity. Velocity becomes the controlling factor.

Pneumatics and the VDPC

In the prior art, pneumatic systems waste energy differently than hydraulic systems. Hydraulic systems waste energy when the fluid moves from higher energy (larger UE value) to lower energy (smaller UE value) without doing work. Pneumatic systems waste energy in three primary ways: First, when the air is compressed, it becomes heated, and that heat is dissipated as the gas travels through the system. This accounts for substantial energy loss before any work is done. Secondly, leakage, both external and internal, is a source of wasted energy with higher pressures contributing to greater loss. The third reason pneumatic systems waste energy is the practice of storing the UE's at a higher pressure than is necessary for the work. Velocity is then controlled by restrictive power controls.

Referring still to the prior art, some of the pneumatic energy loss can be mitigated by placing pressure regulators before the actuators to provide just enough UE strength for acceleration and then applying restrictive orifices to limit the final velocity.

In contrast, the use of the VDPC makes it possible to produce the UE's, either hydraulic or pneumatic, at a pressure that allows the pump or compressor to operate at its highest efficiency. The UE's are then reconfigured to match the power requirement of each individual actuator. For a pneumatic system, this may mean storing the energy at relatively low pressure which reduces the energy lost as heat and minimizes the internal and external leakage. A VDPC can then be used as a pressure intensifier to provide a higher power density to those actuators that require it. A VDPC embodiment as disclosed in the present application could also then be used at the actuator exhaust, providing the necessary resistive load to control velocity. This addresses all three areas of pneumatic system energy waste.

Controlling the VDPC

Figure 6:
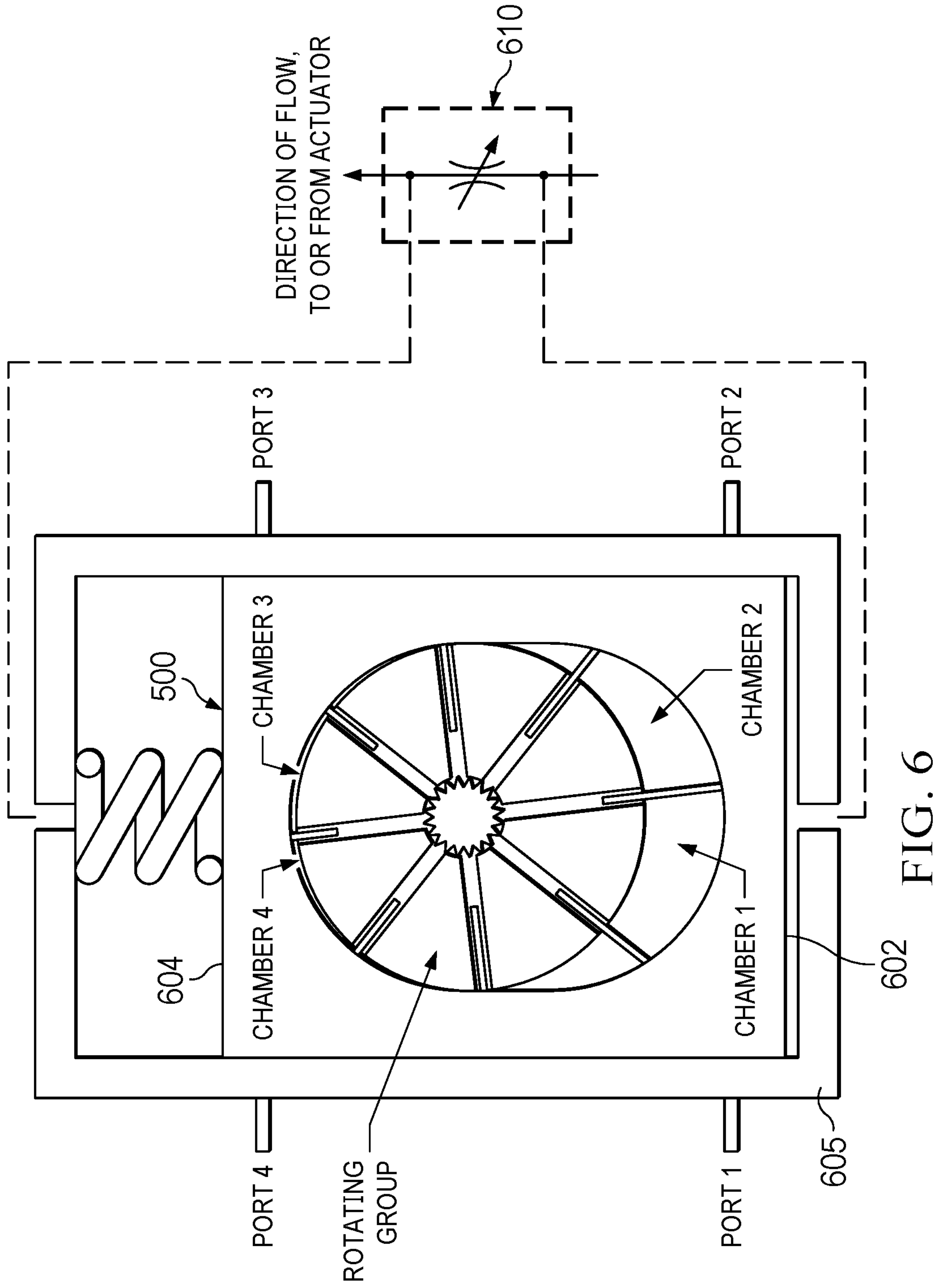
FIG. 6 is an embodiment of the present application showing a mechanism for controlling the displacement of a rotor relative to a cam.

There are several ways to control a VDPC, depending on various factors including the level of accuracy required. Illustrated in FIG. 6 the exemplary VDPC 500 of FIG. 5 is included, although the control techniques described herein may be applied to other VDPC embodiments herein. In FIG. 6, the VDPC 500 is placed in a housing 605 and is translatable within the housing according to differential pressure placed upon opposing ends 602, 604 of the VDPC, e.g., the end 602 having Ports 1 and 2 or the end 604 having Ports 3 and 4. One way to control the pressure on a VDPC is with an adjustable needle valve 610 operating according to the Bernoulli Principle. This principle states that an orifice will have a specific flow rate for any $\Delta p$ across the orifice. Because an actuator velocity requires a specific flow rate, the fluid entering or exhausting can be passed across an orifice and the $\Delta p$ can be used to position the VDPC. This is illustrated in the present figure as using an adjustable needle valve, but the orifice could be adjusted with a proportional solenoid, a handle or a foot peddle.

If more accuracy is needed, feedback from the actuator such as from a tachometer (rotary) or linear transducer (linear) can be used to control the orifice 610 or to directly control the VDPC 500. For example, a piston could impart force on one end of the VDPC 500 with the force of an opposing spring on the other end, or any other number of actuators and control systems could be used such as pistons on either side or other controlled pumps, cylinders, pistons, or controllable flexible membranes.

Below in the specification and accompanying figures various advantageous applications of VDPCs are disclosed in which an embodiment VDPC 500 either makes such applications possible or makes such applications synergistically improved and efficient over known prior art approaches.

Meter-In Power Control of Hydraulic Motor

Figure 7:
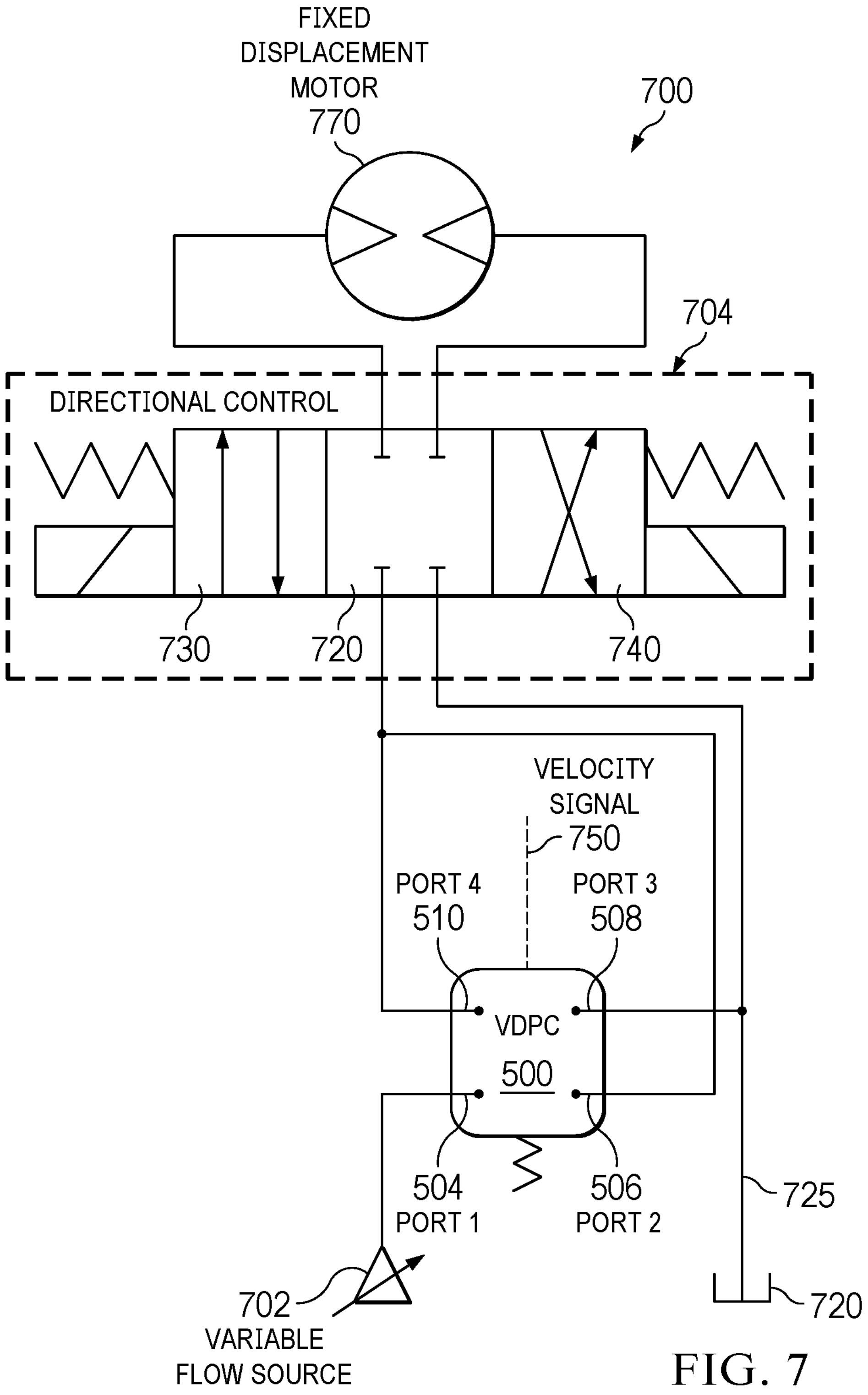
FIG. 7 is an embodiment of the present application in which an embodiment VDPC is used to drive a motor with meter-in power control.

FIG. 7 illustrates a meter-in power control application 700 in which the UE's at the source 702 are charged with more pressure than is required by the load. The VDPC 500 functions as a pressure reducer, matching the velocity demands of the motor.

When the directional valve 704 is shifted from the center position 720 in the middle of the directional control valve, to either of the flow direction positions 730 740, flow is directed to the motor 770, and Port 1 504 receives UE's from the source, discharging them through Port 2 506. Port 3 508 is connected to the reservoir 720 by way of the return line 725 and draws in fluid which is then exhausted under pressure to Port 4 510. As shown in FIG. 7, Port 2 is combined with or tied to Port 4 in this embodiment.

The default condition of the VDPC 500 is for maximum flow from Port 1 504 to Port 2 506. There is a small flow from Port 2 508 to Port 4 510 at the default condition. The result is that full source pressure is available to the motor at start-up providing rapid acceleration for the motor.

As the motor 770 approaches the desired rpm, the velocity signal 750 (such as from a tachometer) begins to modulate the position of the rotating group 580 within the PEC 515 and 516 (not shown, see FIG. 5), e.g., in the current rendering drawing the rotating group 580 moves down from the Port 3/Port 4 side of the VDPC to the Port 1 Port 2 side and thereby opens up the chambers 545 550 (not shown, see FIG. 5). This opening up of Chamber 545 and Chamber 550 draws more fluid from the reservoir to into Port 3. This increases the flow and decreases the pressure at Port 4 510, reducing the rate of acceleration. At target rpm, the UE's from the source are reconfigured into the UE's required by the motor.

For example, a motor with a displacement of 50 $cm^3$ operating at 1550 rpm at a pressure of 15 MPa, will require 50 $cm^3$×1550 or 77,500 $cm^3$×15 MPa UE/min. This equals 1,162,500 UE's/min. If the source is at a pressure of 20 MPa, each $cm^3$ is charged with 133% more energy than is needed. Only 58,125 of the source UE's are needed for the job. The VDPC reconfigures 58,125 UE's/min at 20 MPa into 77,500 UE's/min at 15 MPa by drawing in 19,375 $cm^3$/min from the reservoir.

Meter-in power control may be used for hydraulic motors that do not need resistive pressure to prevent a run-away event. A motor case drain may not be required.

Meter-Out Power Control of Hydraulic Motor

Figure 8:
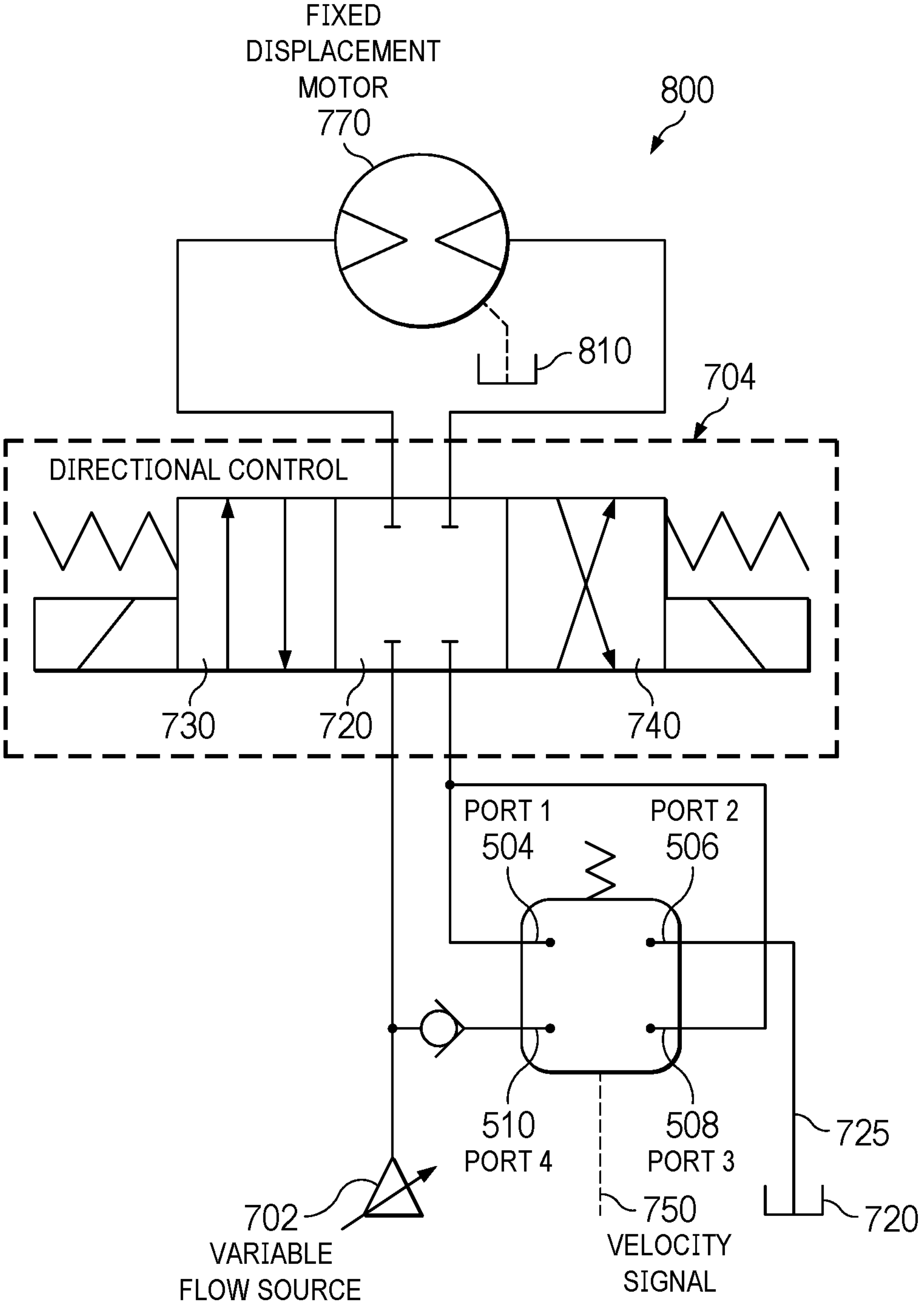
FIG. 8 is an embodiment of the present application in which an embodiment VDPC is used to drive a motor with meter-out power control.

FIG. 8 illustrates a meter-out power control application 800 in which the VDPC 500 functions as a pressure intensifier. The direction control module 704 operates in this figure as was described in FIG. 7 to switch from a center position 720 to either directional position 730 740. The VDPC 500 receives flow from the outlet of the motor, not from the variable source. The default condition of the VDPC 550 is for maximum flow from Port 1 to Port 2 which is connected to the reservoir. At start-up, exhaust flow from the motor passes through the VDPC to the reservoir with little restriction. There is no flow from Port 4. This results in full source pressure to the motor, providing rapid acceleration.

As the motor approaches the target rpm, the velocity signal causes the oval cam to shift, reducing the displacement of chambers 1 and 2. With less flow from Port 1 504 to Port 2 506, more flow is driven through Port 3 508 to Port 4 510. Port 4 510 is at source pressure 702. The pressure at Ports 1 and 3 is designed to be great enough to provide enough torque on the rotating group 580 to drive flow out of Port 4 at source pressure. This produces the necessary resistive pressure at the motor exhaust to counteract the high source pressure.

The UE's exhausting from the motor are designed to have the pressure necessary to resist the acceleration and maintain the correct motor rpm. However, these UE's are not consumed as heat as with a restrictive orifice but are reconfigured into a reduced volume at the same pressure as the variable flow source 702.

For example, a motor with a displacement of 50 $cm^3$ operating at 1550 rpm at a pressure of 15 MPa, will require 50 $cm^3$×1550 or 77,500 $cm^3$×15 MPa UE/min. This 1,162,500 UE's/min. It takes 50 $cm^3$ to rotate the motor one revolution. If the source is at a pressure of 20 MPa, each $cm^3$ is charged with 133% more energy than is needed. A resistive load of 5 MPa will be required to reduce the acceleration and maintain velocity.

77,500 $cm^3$/min are needed, but there is enough energy in 58,125 $cm^3$/min of the source to do the job.

The VDPC receives the 77,500 $cm^3$/min at 5 MPa from the motor, diverts 58,125 $cm^3$/min at 0 MPa to the reservoir, and intensifies 19,375 $cm^3$/min from 5 MPa to 20 MPa to be fed into the line from the source. This reduces the flow taken from the source to 58,125 $cm^3$/min.

Meter-out power control is used for motors that need resistive pressure to prevent a run-away event. A motor case drain 810 may often be required in this application 800.

Meter-In Power Control of Double Acting Cylinder

Figure 9:
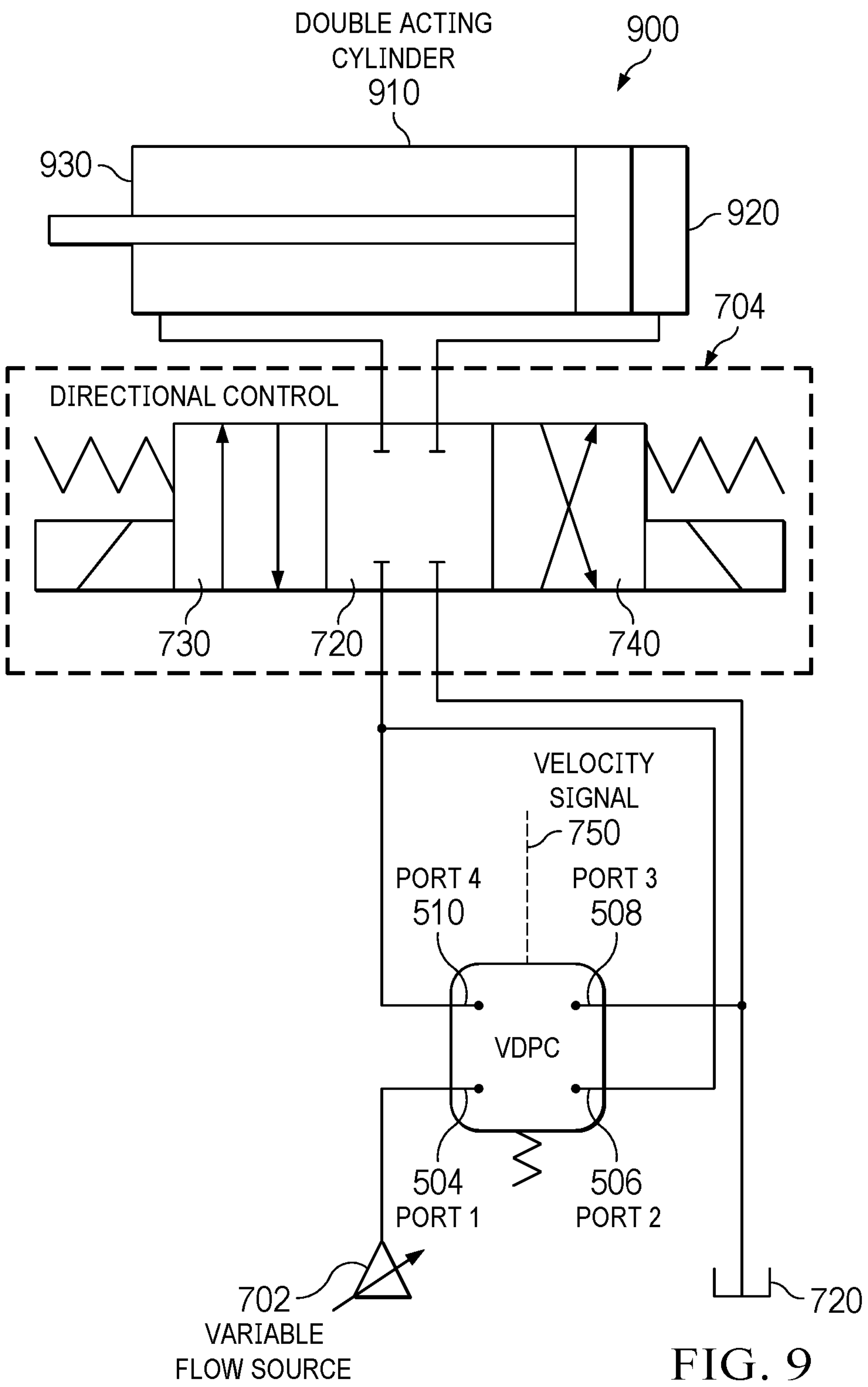
FIG. 9 is an embodiment of the present application in which a VDPC is used to drive a double acting cylinder with meter-in power control.

FIG. 9 illustrates a meter-in power control of a double acting cylinder application 900, in which the $U_E$'s at the source are charged with additional pressure relative to normal working demands. The VDPC 500 functions as a pressure reducer, matching the linear velocity demands of the double acting cylinder 910 having a cap end 920 and a rod end 930.

When the directional valve 704 is shifted from its center position 720 to either of its directional positions 730 740, Port 1 504 receives UE's from the source 702 and discharges them through Port 2 506. Port 3 508 is connected to the reservoir and draws in fluid which is then exhausted under pressure to Port 4 510. Port 2 is combined with Port 4.

The default condition of the VDPC 500 is for maximum flow from Port 1 to Port 2. There is a small flow from Port 3 to Port 4 in this default condition. The result is that full source 702 pressure is available to the cylinder 910 at start-up providing rapid initial acceleration.

As the cylinder approaches the desired translational speed, a velocity signal 750 begins to modulate position of the rotating group 580 within the power exchange cavity 515, e.g., in the current rendering moving the rotating group 580 (not shown, see FIG. 5) down from the Port 3/Port 4 side of the VDPC to the Port 1 Port 2 side and thereby opening up the chambers 545 550 (not shown, see FIG. 5). This opening up of Chamber 545 and Chamber 550 draws more fluid from the reservoir to into Port 3. This increases the flow and decreases the pressure at Port 4 510, reducing the rate of acceleration. At target translational velocity of the cylinder 910, the UE's from the source are reconfigured into the UE's required by the cylinder 910.

For example, a cylinder with a volume of 1,000 $cm^3$ must extend at 0.5 m/sec at a pressure of 15 MPa. The variable source pressure from a PC pump or an accumulator is at 20 MPa. The amount of work to be done is 15 MPa×1,000 $cm^3$ or 15,000 MPa/$cm^3$. There is enough energy in 750 $cm^3$ at the source to do the job, but 1,000 $cm^3$ are needed to fill the cylinder.

The VDPC reconfigures 750 UE's at 20 MPa into 1,000 UE's at 15 MPa by drawing 50 $cm^3$ from the reservoir and adding it to the flow to the cylinder 910.

If the load on the cylinder 910 changes, and/or the pressure at the variable source changes, the velocity signal 750 can automatically cause the VDPC 500 to adjust to control the speed.

If a different velocity is needed for the cylinder to retract, a new signal 750 can be sent to the VDPC. The signal could also be changed while the cylinder is moving for profiling.

Meter-Out Power Control of Double Acting Cylinder

Figure 10:
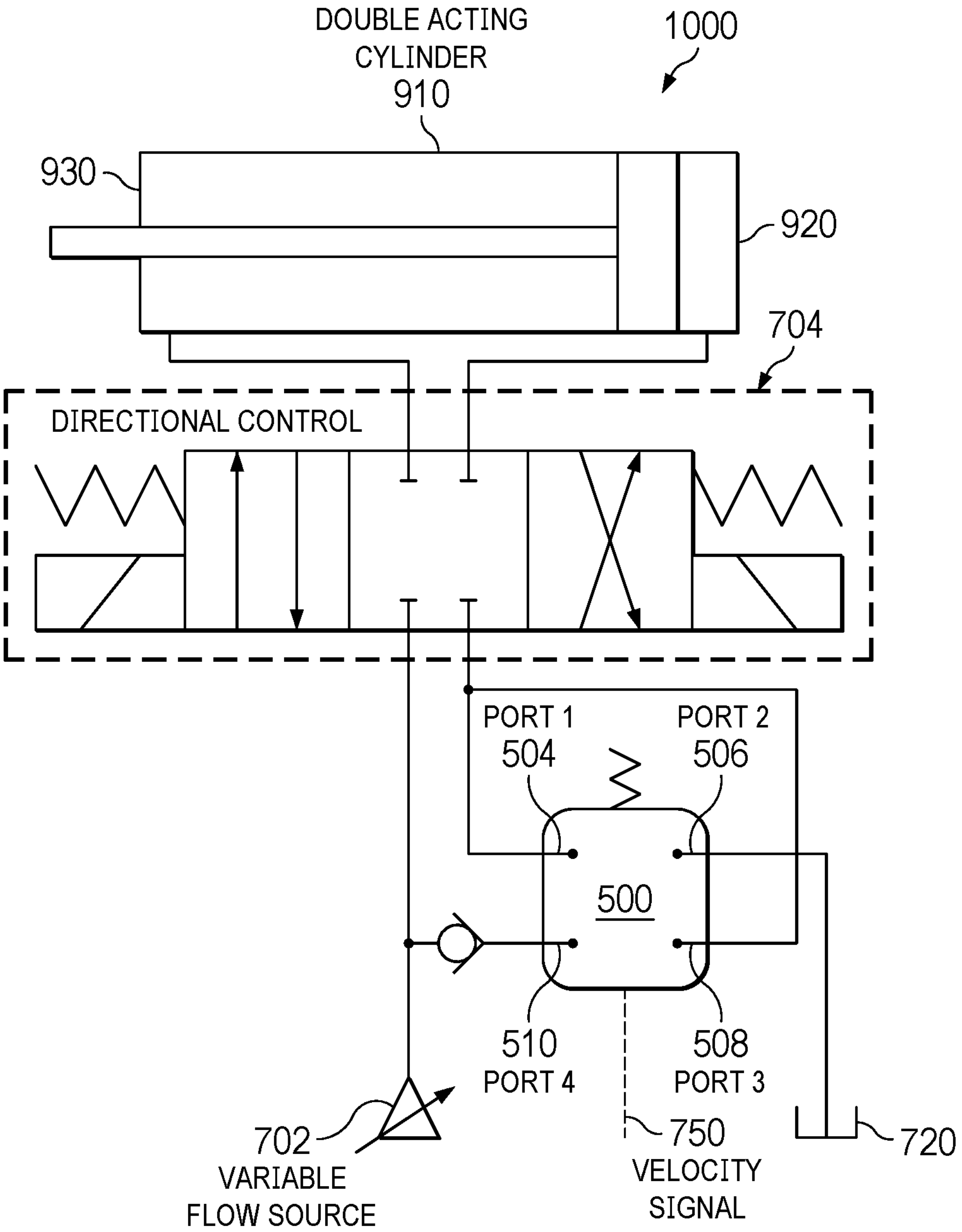
FIG. 10 is an embodiment of the present application in which a VDPC is used to drive a double acting cylinder with meter-out power control.

FIG. 10 illustrates a meter-out power control of a double acting cylinder application 1000, in which disclosed embodiment VDPC 500*s* may be configured to function as a pressure intensifier. Port 1 504 and Port 3 508 receive fluid from the exhaust of the cylinder 910, both as it extends and retracts. Port 2 506 is connected to the reservoir 720. Port 4 510 is connected to the Variable Flow Source 702.

As described in the above applications, the direction control module 704 has a center position 720 and first and second directional positions 730 740 that cause the double acting cylinder to extend or retract. The default condition of the VDPC 500 is to allow maximum flow from Port 1 to Port 2, so fluid passes through the VDPC 500 to the reservoir with little restriction. This results in full source pressure to the cylinder which provides initial rapid acceleration.

As the cylinder 910 approaches a target speed for the designed application, a velocity signal 750 causes the rotating group 580 within the PEC 515, e.g., in the current rendering the rotating group 580 is moved "upward" from the Port 3/Port 4 side of the VDPC to the Port 1/Port 2 side, thereby reducing the displacement of Chamber 1 and Chamber 2 (not shown, see, e.g. FIG. 5). With less flow from Ports 1 to 2, more flow is driven through Port 3 to Port 4. Port 4 is at source pressure and so, the pressure at Ports 1 and 3 are designed to be great enough to provide enough torque on the rotating group 580 to drive flow out of Port 4 at source pressure. This produces the resistive pressure at the cylinder exhaust to counteract the high source pressure.

The resistive energy is not wasted, but is instead reconfigured, reducing the energy taken from the source.

For example, a cylinder with a cap end volume of 1,000 $cm^3$ and a rod end volume of 700 $cm^3$ must extend at 0.5 m/sec at a pressure of 10 MPa. The variable source pressure from a PC pump or an accumulator is at 20 MPa. The amount of work to be done is 10 MPa×1,000 $cm^3$ or 10,000 MPa/$cm^3$. There is enough energy in 500 $cm^3$ at the source to do the job, but 1,000 $cm^3$ are needed to fill the cylinder.

The VDPC 500 receives 700 $cm^3$ at 14.29 MPa from the rod end 930 of the cylinder extending, diverts 200 $cm^3$ at 0 MPa to the reservoir, and intensifies 500 $cm^3$ from 14.29 MPa to 20 MPa to be fed into the line from the source. This reduces the volume taken from the source to 500 $cm^3$.

Retracting the cylinder causes the VDPC 500 to receive from the cap end 1,000 $cm^3$ at 4 MPa which is 4,000 MPa/$cm^3$ units of work, while the rod end receives 700 $cm^3$ at 20 MPa for 14,000 units of work. The VDPC diverts 800 $cm^3$ to the reservoir at 0 MPa and intensifies 20 $cm^3$ to 20 MPa which is fed to the source line. The volume from drawn from the source is reduced to 500 $cm^3$.

If the load on the cylinder 910 changes, and/or if the pressure at the variable source 702 changes, the velocity signal 750 may be configured to automatically causes the VDPC 500 to adjust to control the speed.

If a different velocity is needed for the cylinder to retract, a new signal 750 can be sent to the VDPC 500. The signal could also be changed while the cylinder is moving for profiling.

Power Optimizer and Power Optimizer with Intensification

Figure 11A:
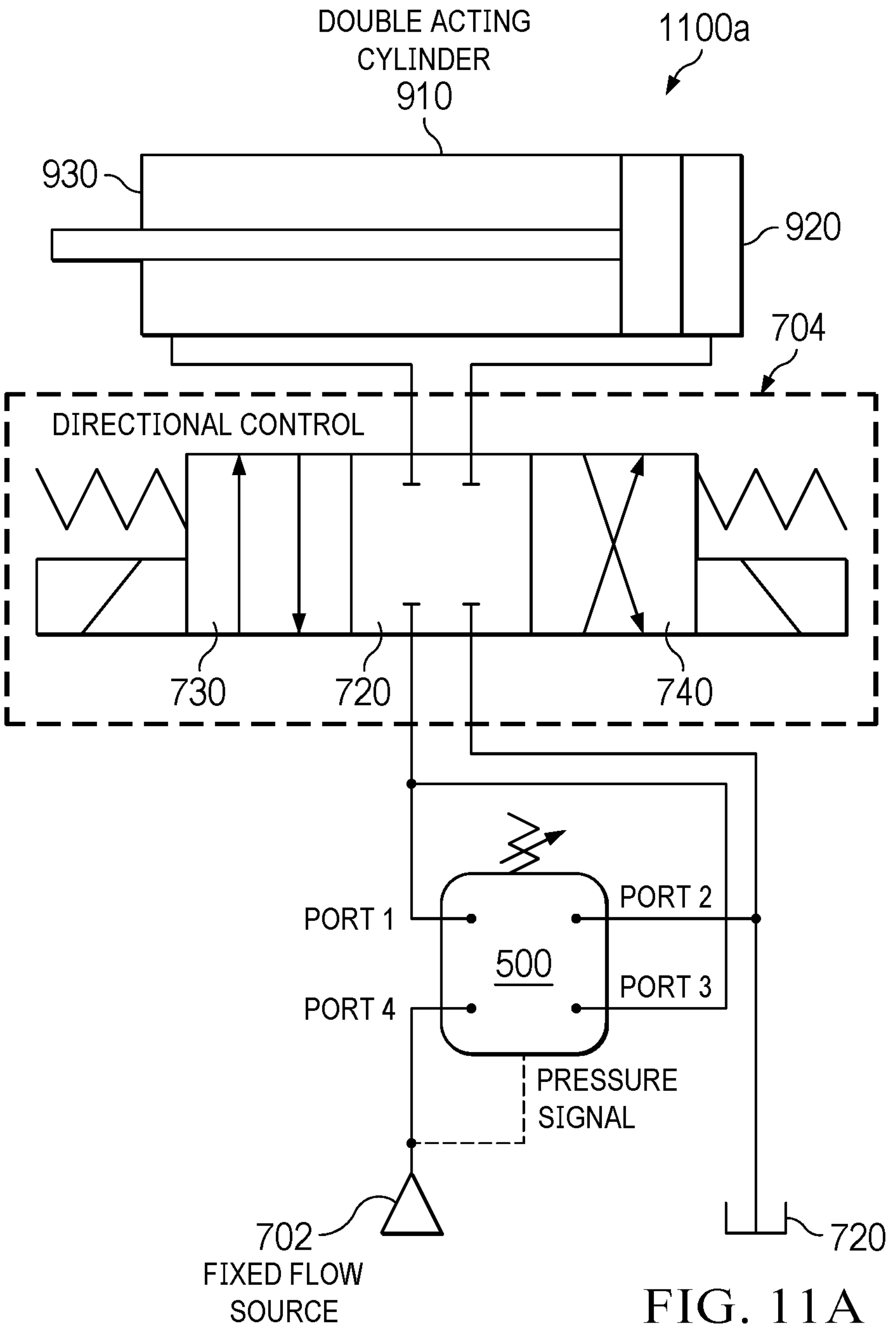
FIGS. 11A-11B illustrates exemplary embodiments in which a VDPC can be used in prior-art applications that would have conventionally used a high/low pump.
Figure 11B:
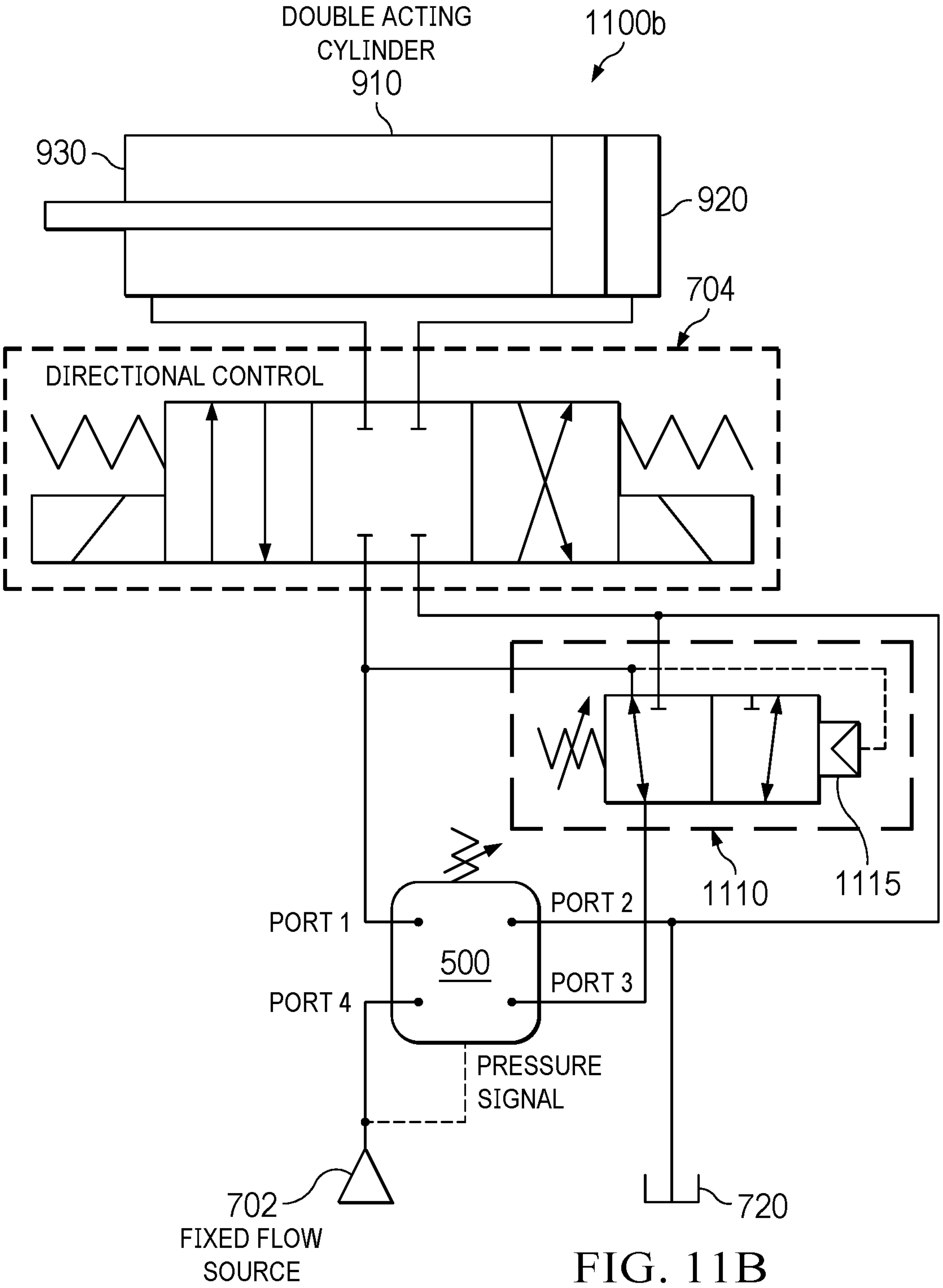

FIGS. 11A-11B illustrate exemplary embodiments 1100*a*, 1100*b* in which a VDPC 500 can be used to replace circuits in prior art applications that would have used a "high/low" pump such as a log splitter or a compactor. In these instances, two pumps were previously provided to give maximum start-up velocity and then one pump is dropped out to let a single remaining pump provide maximum force. Thus, in such configurations there are two conditions: (1) high velocity/low force and (2) low velocity/high force.

In the disclosed present embodiments, a VDPC 500 receives the UE's from the fixed source 702 and reconfigures them into an optimum energy level. Flow from the source 702 drives the fluid from Port 4 to Port 3 creating torque on the rotating group 580 (not shown, see FIG. 5). This causes fluid to be drawn in from the reservoir 720 at Port 2 and pushed out of Port 1. With specific regard to the embodiment of FIG. 11A, the outflow from Port 1 is combined directly with the outflow at Port 3 and then can be used to drive the double acting cylinder 910 when the directional control 704 is moved from its center position 720 to either of its movement positions 730 740.

The default position of the VDPC 500 is for minimum displacement at Ports 4 and 3 (Chambers 4 and 3—see, e.g., FIG. 5) with maximum displacement is at Ports 2 and 1 (Chambers 2 and 1, see, e.g., FIG. 5). With minimum displacement at Ports 4 and 3, source flow produces maximum rpm at minimum torque. Maximum rpm produces high inlet flow at Chamber 2 with maximum flow out of Port 1. Under low load pressure there is minimal torque on the rotating group and maximum flow. As pressure increases at the source due to the increased resistive pressure of the load, the pressure signal acts on the rotating group to increase the displacements of Chambers 4 and 3 and decrease the displacements of Chambers 2 and 1. This produces an increase in torque and a decrease in RPM on the rotating group and a decrease in flow through Ports 4 to 3. Ports 4 to 3 function as a motor with continually increasing torque while Ports 2 and 1 function as a pump with an ever decreasing volume. The UE's entering at Port 4 are continually and adaptively reconfigured so that the input power matches the output power of flow and pressure.

The addition of a selector valve 1100 in FIG. 11B adds the benefit of pressure intensification. When load pressure reaches the setting of the selector 1115, it shifts the selector valve 1100, directing the flow from Port 3 to the reservoir 720. Full torque supplied by the pressure at Port 4 is available to push a minimum flow at highest pressure from Port 1.

Counterbalance/Brake

Figure 12:
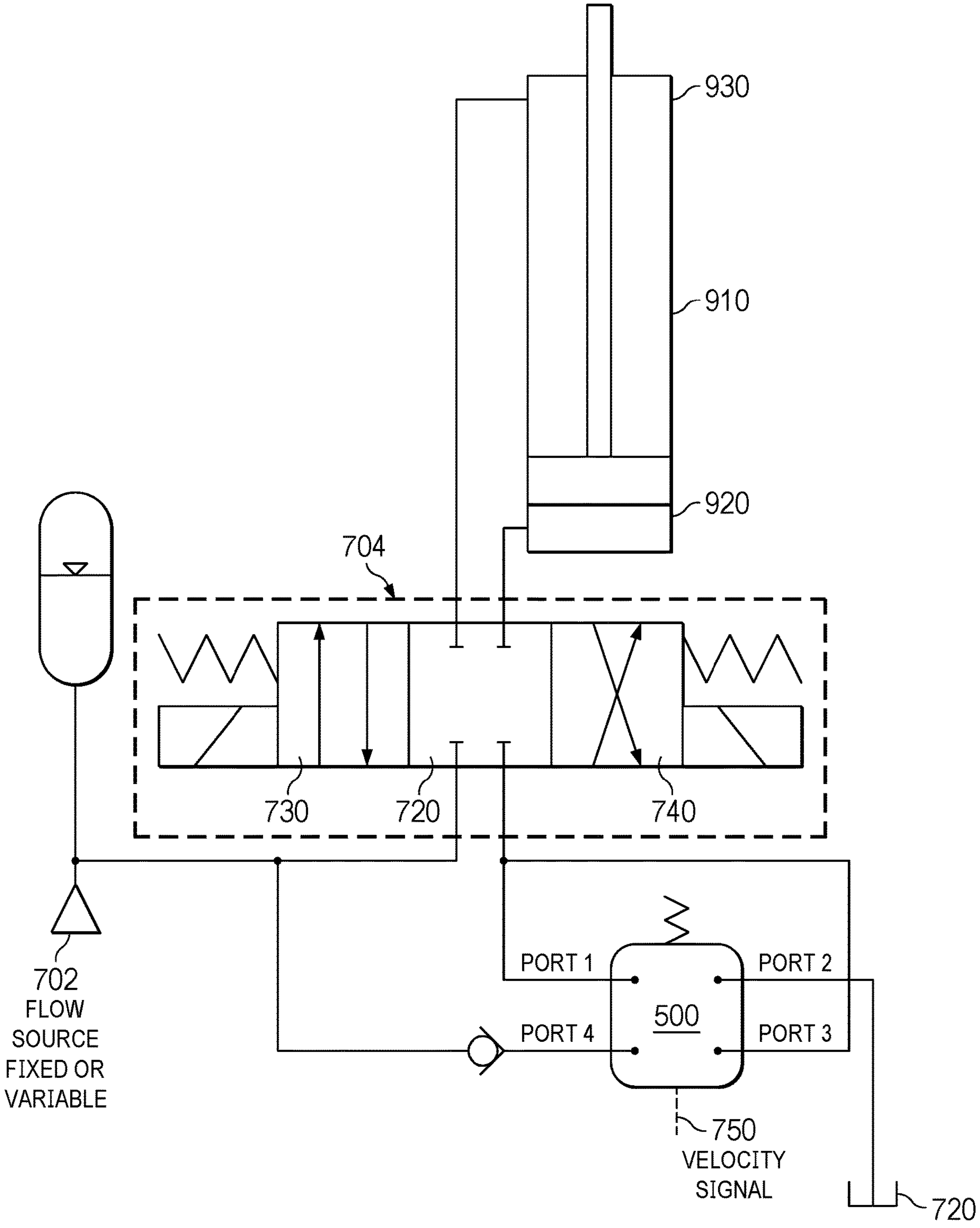
FIG. 12 is an embodiment of the present application in which a VDPC is used as a counterbalance/brake.

FIG. 12 illustrates an embodiment 1200 that provides a counterbalance or brake when gravity or inertia is trying to pull a load away from an actuator (e.g., a cylinder or motor). In such instances, there is potential energy in a lifted load or kinetic energy in a moving load that must be managed to control velocity. In the prior art, normally a counterbalance or brake valve is used to capture and dissipate the energy as heat. The VDPC 500 does not dissipate the energy but returns it to the source as shown in this application 1200.

In the illustrated embodiment, an accumulator stores the kinetic energy captured by the VDPC 500 as it provides the resistance to the movement of the load.

In this circuit, the VDPC is in the return line from the directional control valve. It functions as a meter-out velocity control. It causes the actuator to draw only the energy needed to move the load. When the load is lowered, no energy is needed from the source. The VDPC resists the load, not by dissipating the energy, but by using the energy to drive the VDPC as an intensifier, pushing the energy back into the source. The VDPC provides velocity control extending and retracting as well as energy recovery when the load is lowering or over-center.

Power Divider/Combiner

Figure 13:
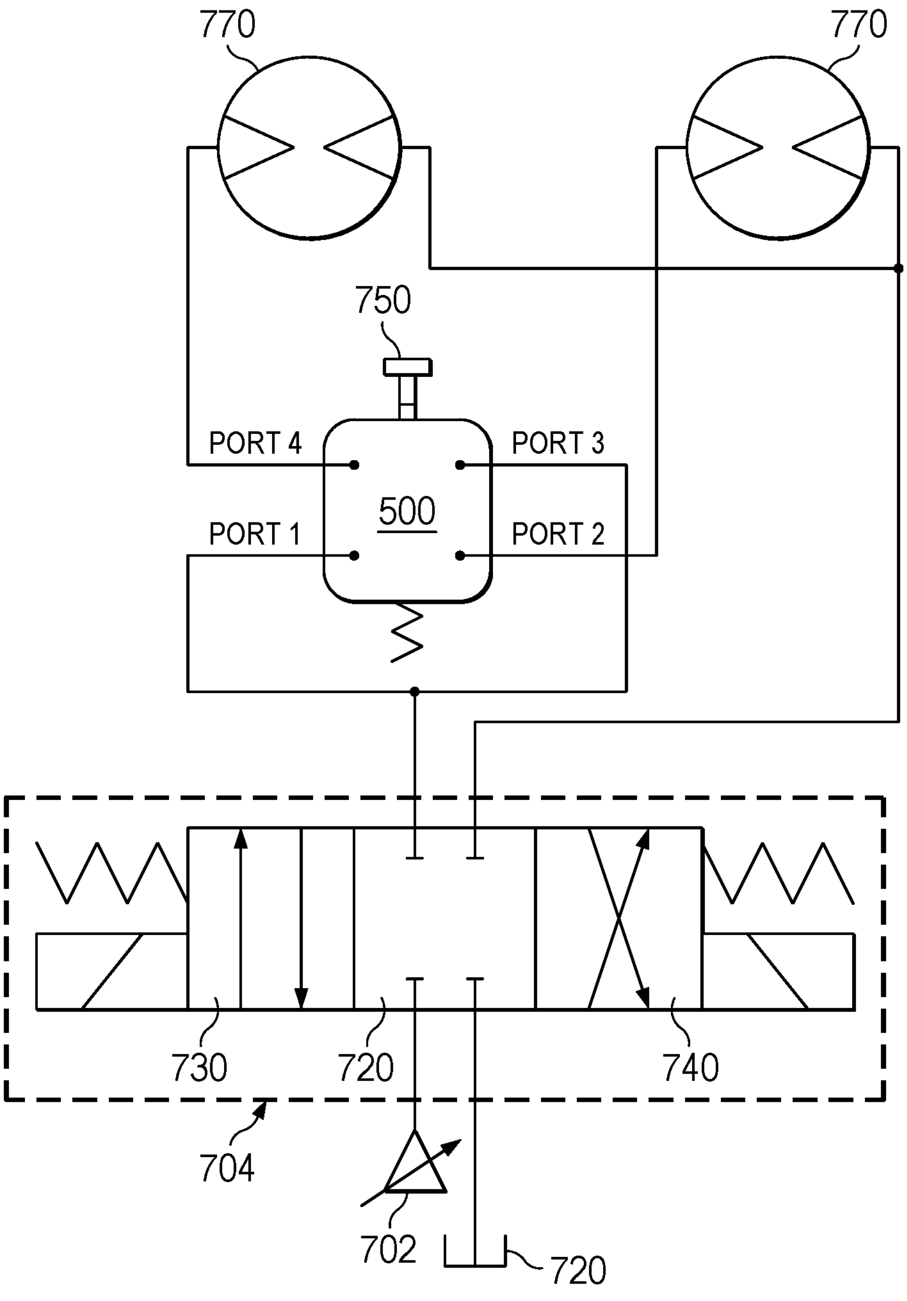
FIG. 13 is an embodiment of the present application in which a VDPC is used as a power divider/combiner.

FIG. 13 illustrates an approach where the VDPC 500 can also be used as a power divider/combiner. In the prior art, when using two fixed displacement motors are connected on a common shaft, the ratios of power division are limited to the available displacements of the motors. Once chosen, there is no adjustment available. In contrast, this embodiment 1300 provides an approach in which there are an infinitely adjustable ratio of power divisions. This enables the tuning of a system to match a need.

This approach divides the flow to fixed displacement motors 770 in proportion to the displacements of Chambers 1 and 2 and that of Chambers 3 and 4 (not shown, see FIG. 5). The input pressure will be an average of the two load pressures.

The VDPC 500 also combines the reverse flow from the motors 770 in the same proportion. The actuator velocity is the same in both directions and is determined by the flow from the source and the proportional division between the fluid flows as defined by the VDPC adjustment. The illustrated embodiment 1300 of FIG. 13 provides for two motors 770 and a VDPC adjustment 750. This could be any combination of motors and/or cylinders and the control could be, e.g., remote with a pilot or solenoid controlled by a PLC. Further adjustment can be provided by the variable source 702.

Velocity Control of Single Acting Cylinder

Figure 14:
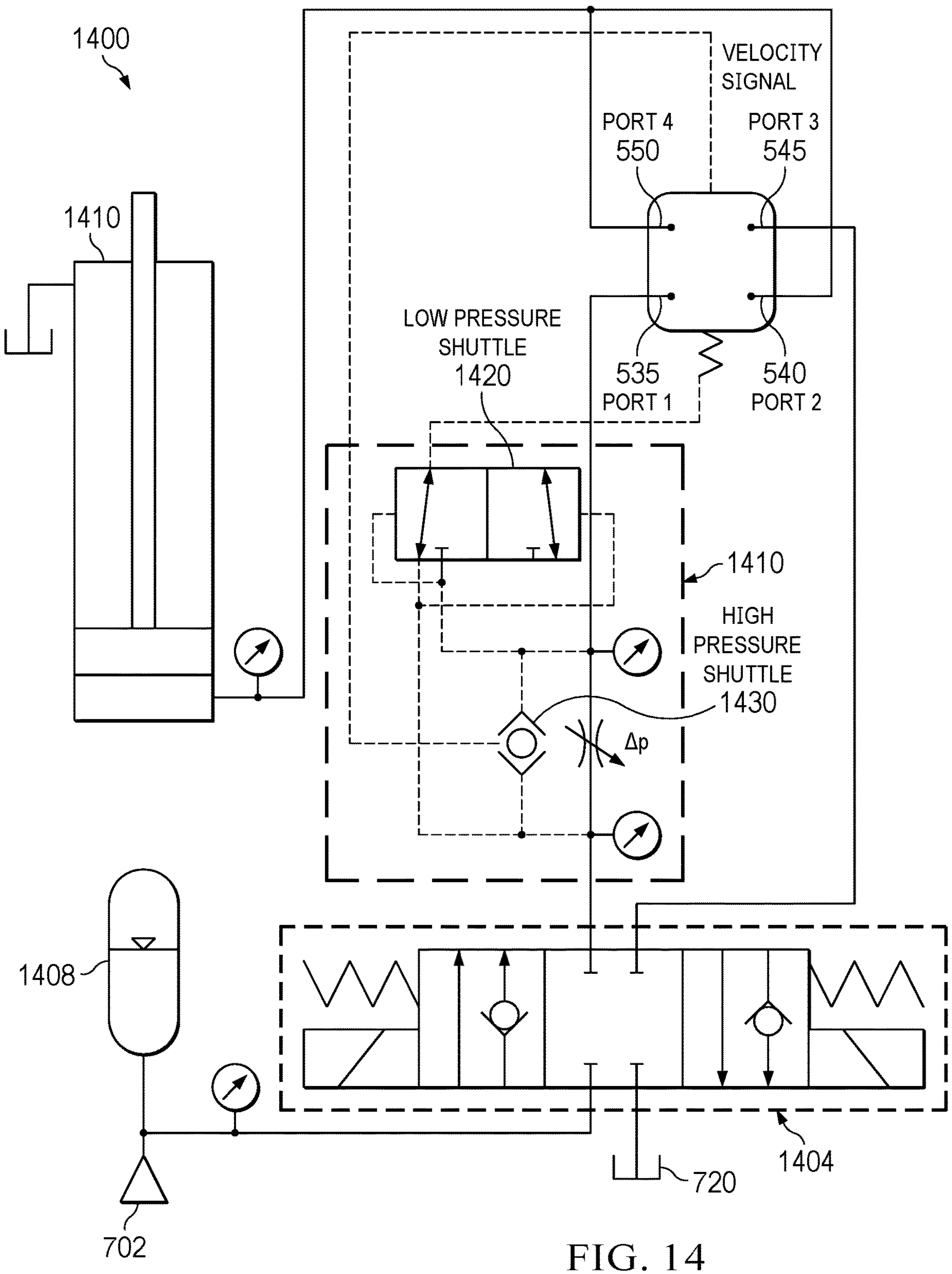
FIG. 14 is an embodiment of the present application in which a VDPC provides velocity control of a single acting cylinder.

FIG. 14 depicts an embodiment application 1400 which provides velocity control of a single acting cylinder 1410 (one where the cylinder is only powered in one direction and an external force causes it to reverse). In this embodiment, the method of control shown is using the Δp across an orifice and using a shuttle valve collection 1410 of two shuttle valves—a low pressure shuttle valve 1420 and a high pressure shuttle valve 1430—that send the correct Δp signal to the VDPC 500. The velocity control signal could be from another source but is shown here as a Δp for illustration.

Lifting the load means directing the charged UE's from the accumulator 1408 through the VDPC 500, using the reducing function. Upon lowering the load, the UE's exhausting the cylinder 1410 are directed back through the VDPC 500 where they are intensified and return the energy to the accumulator 1408.

Energy is saved lifting the load by only using the source energy necessary. Energy is saved when lowering the load as the KE is sent back to the accumulator 1408.

The VDPC is controlled by the Δp across an orifice. The location of the higher and lower pressures depends on the direction of flow. Shuttle valve 1430 reveals the upstream (higher) pressure while shuttle valve 1420 reveals the downstream (lower) pressure. These two opposing pressures position the rotating group 530 within the power chamber 515. A change in the Δp in either direction would result in a change of position of rotating group 530.

In the center condition (shown) the switching module 1404 holds the cylinder in place. When the switching module 1404 is shifted to the right, fluid from the accumulator 1408 is directed across the orifice. Shuttle valve 1430 directs the higher pressure to the velocity signal port of the VDPC 500. Suttle valve 1420 directs the lower pressure to the opposing side of the VDPC 500. With the direction of flow from Port 1 to Port 2 540, the VDPC functions as a pressure reducer, limiting the rate of flow to the cylinder.

Shifting the switching module 1404 completely to the left allows high pressure fluid in the cylinder to return through Ports 4 550 and 2 540 of the VDPC 500. Flow from Port 1 535 returns through the orifice and flow from Port 3 545 is directed to the reservoir. Shuttle valve 1430 sends the pressure upstream from the orifice to the velocity signal port on the VDPC 500. Shuttle valve 1420 sends the downstream pressure to the opposing side of the VDPC 500.

With the direction of flow from Ports 4 550 and 2 540 to Ports 1 535 and 3 545, the VDPC 500 functions as a pressure intensifier. This increases the power density of the UE's which can now be recovered and put back in storage in the accumulator 1408.

Once the cylinder is lifted, the potential energy is recovered each time the cylinder is lowered with only the mechanical inefficiencies being made up by the source flow 702.

Using the VDPC 500 in this manner, a very large cylinder with a heavy load can be lifted and lowered very quickly and repeatedly using an accumulator 1408 and a very small source flow 702. The source flow would be sized to only accommodate the mechanical and volumetric inefficiencies.

Figure 15A:
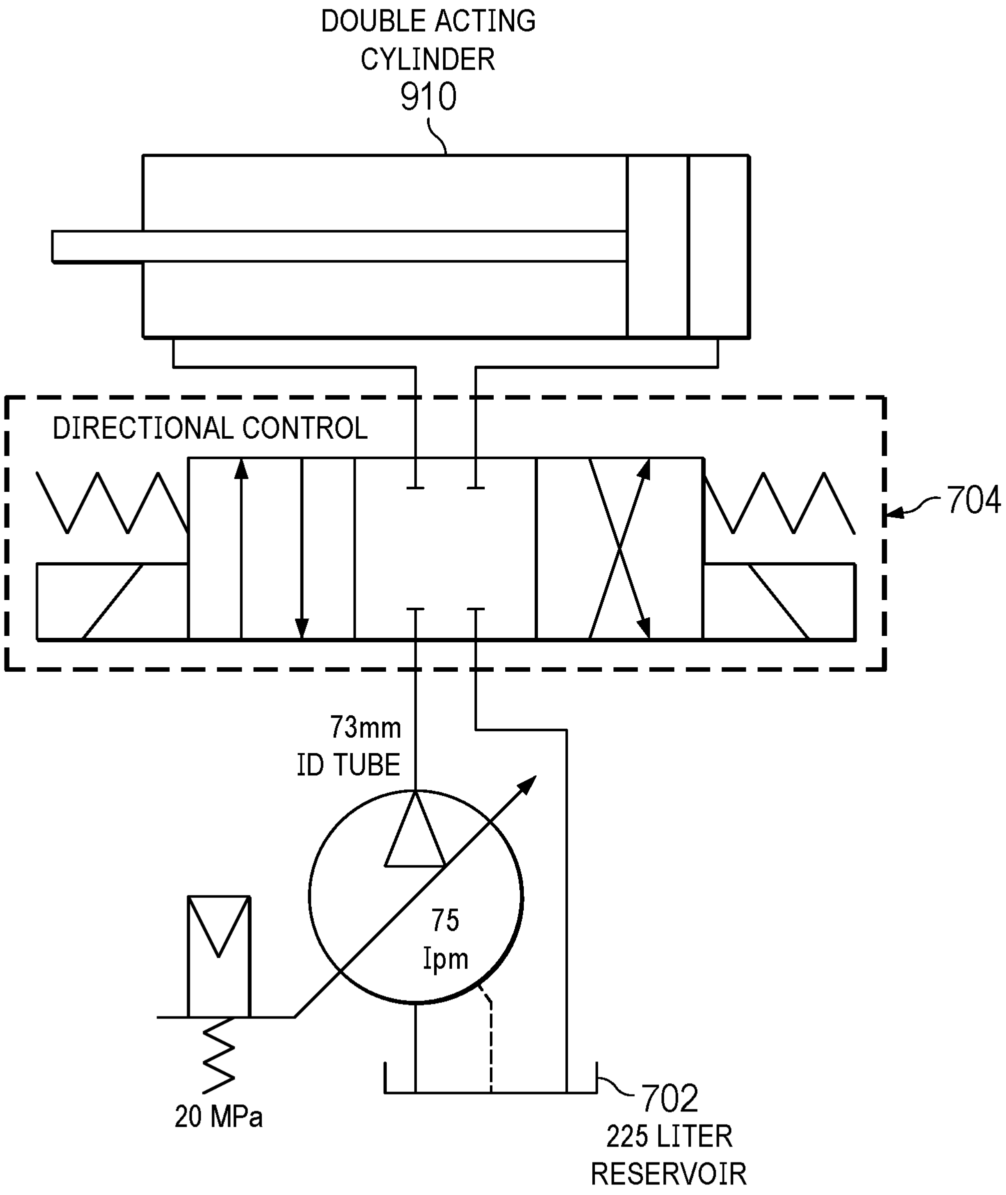
FIGS. 15A-15B are prior art and present embodiment illustrations demonstrating improved efficiency of the present embodiment approaches.

While the above applications describe preferred embodiment applications of the VDPC embodiments disclosed in the present application, the embodiments disclosed herein provide a number of general advantages that are further described below in FIGS. 15A-15B.

More Efficient Components

A very important function of the VDPC is to allow the most efficient components to be used to supply the energy. Many of the hydraulic pumps are designed so that they operate most efficiently at higher pressures, sometimes much higher than is required by the work being done. The embodiment of FIG. 15B contrasted to a conventional circuit as shown in FIG. 15A shows how the embodiments described herein can be used to lessen the diameter of the hydraulic tubing by 25%, 35% or 50% in a particular embodiment to accomplish the same end function. The FIG. 15B embodiment shown below provides an approximate 25% reduction in tubing ID (55 mm ID tube compared to a 73 mm ID tube).

Figure 15B:
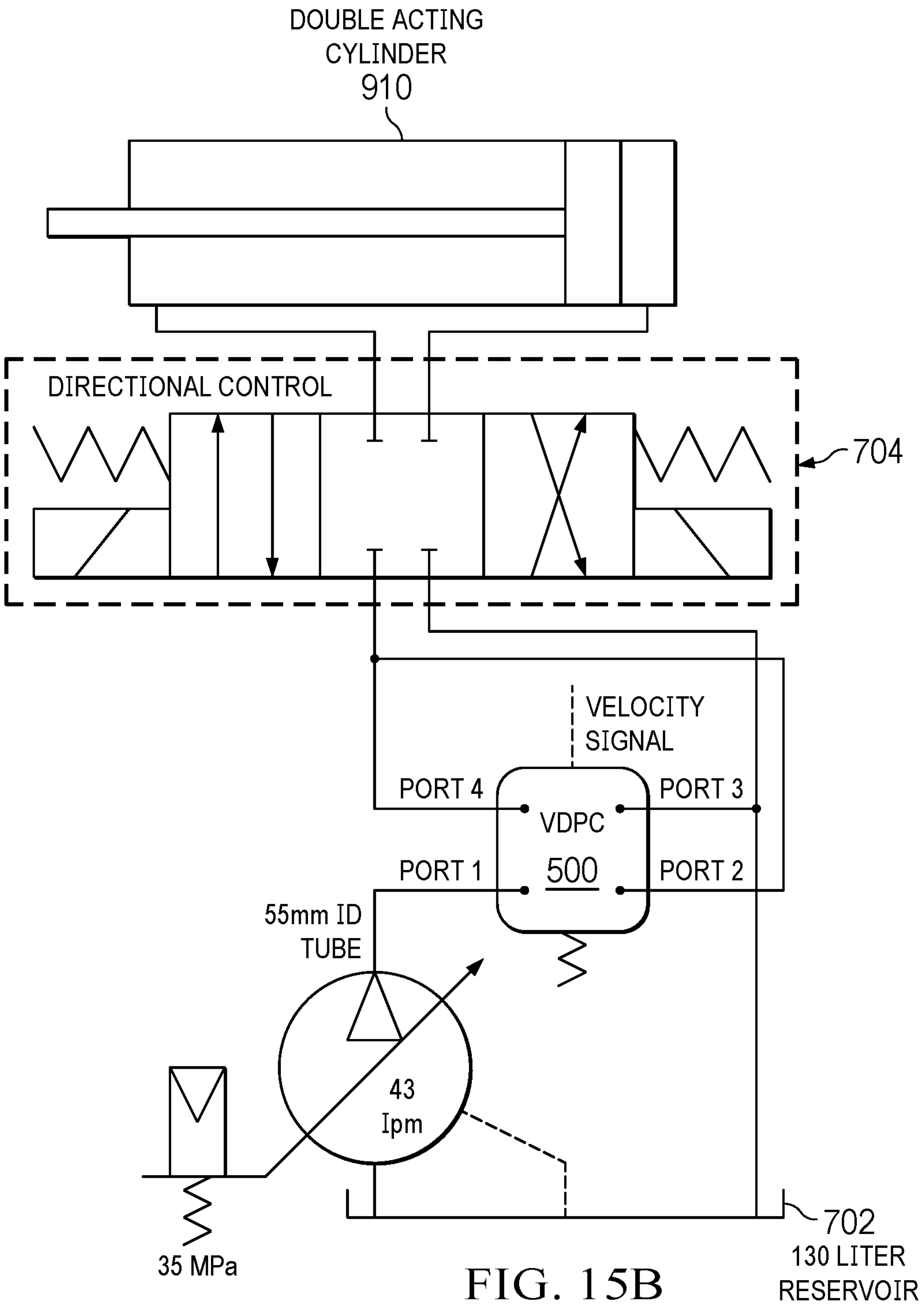

The FIG. 15B embodiment further illustrates an embodiment where the reservoir size can be reduces by 25%, 35%, or 50% in a particular embodiment to accomplish the same end function. For example, the FIG. 15B embodiment below provides an approximate 42% reduction in the reservoir size (130 L compared to a 225 L reservoir).

The FIG. 15B embodiment further illustrates an embodiment where the flow rate source provided to the system can be reduced by 25%, 35%, or 50% in a particular embodiment to accomplish the same end function. For example, the FIG. 15B embodiment below provides an approximate 43% reduction in the flow rate source (43 Ipm vs. 75 Ipm in this embodiment).

The FIG. 15B embodiment accomplishes this improvement as an exemplary application by taking a conventional system that would have required a flow of 75 Ipm at 20 MPa and that uses a pump that supplied 43 Ipm at 35 MPa and then through the use of a VDPC 500 that converts the energy to the higher flow/lower pressure. This provides the system designer with the option to supply a smaller, more efficient pump, smaller reservoir, less fluid, smaller, lighter, and less expensive system components with reduced plumbing sizes. The supply side produces the energy in its most efficient manner and the demand side uses the energy in an efficient manner as it is reconfigured by the VDPC 500.

Without loss of generality of the foregoing applications that were generally described as being hydraulic systems, for illustration purposes the following applications are described in the context of exemplary pneumatic systems.

Releasing Stored Energy

Figure 16A:
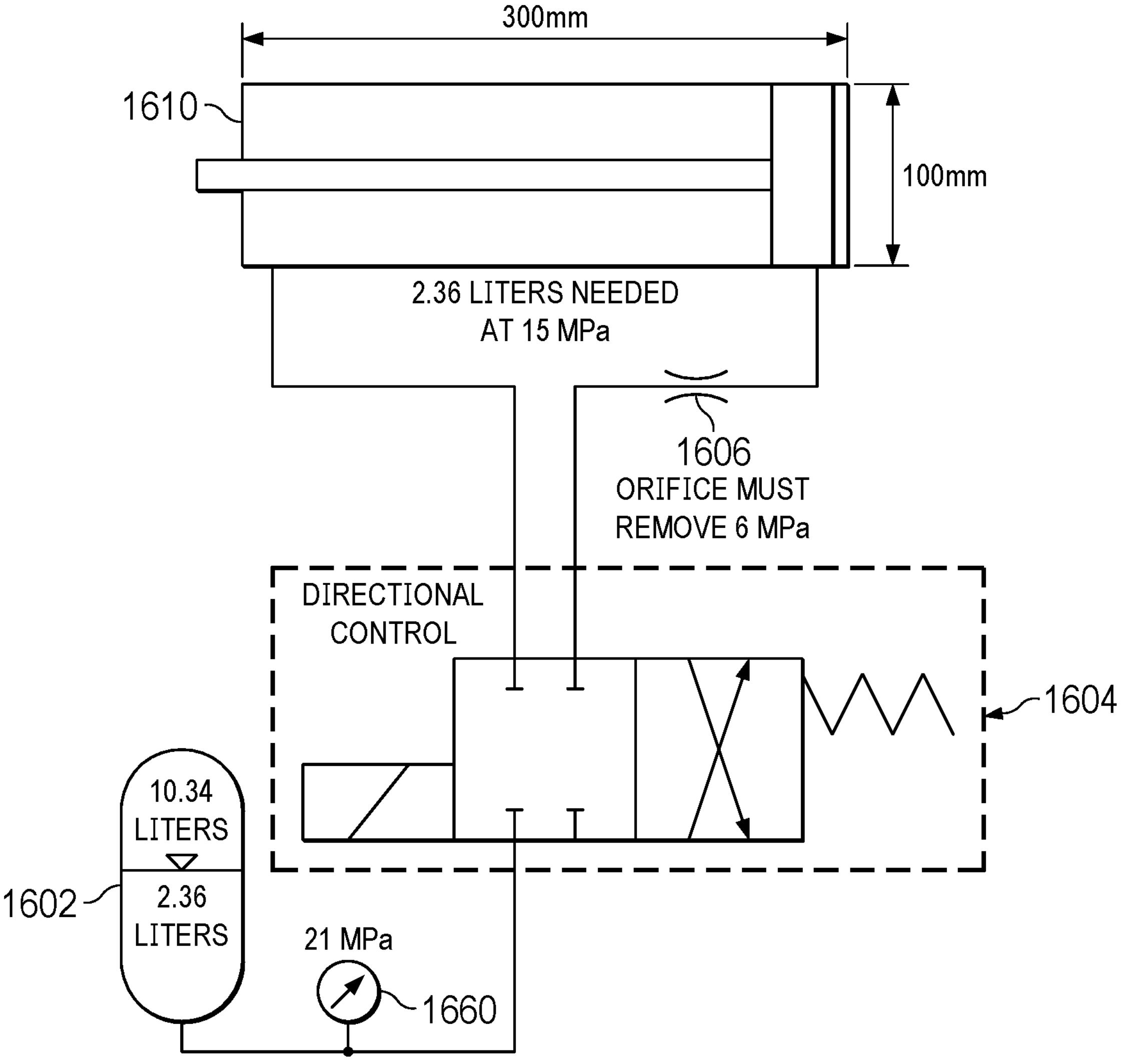
FIGS. 16A-16B are prior art and present embodiment illustrations demonstrating improved applications of stored energy systems.
Figure 16B:
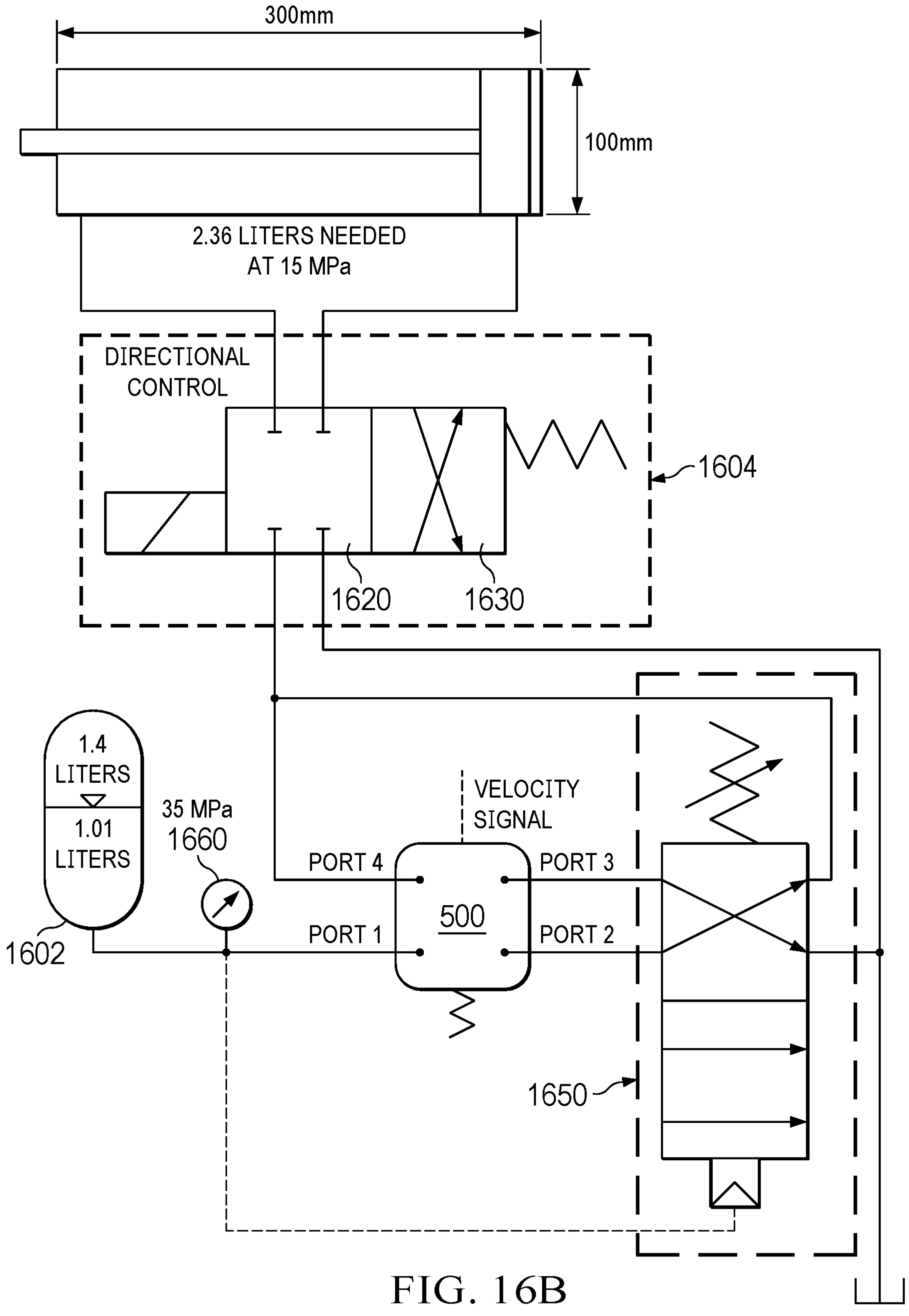

FIG. 16A-16B illustrate, for example, how an improved embodiment of FIG. 16B could be implemented in the conventional system of FIG. 16A. In general, in a pneumatic system, when a gas-charged accumulator is used to store energy, the accumulator must store the energy at a much higher pressure than is required by the work. This is because the gas pressure is reduced as the gas volume increases during the liquid discharge. The energy charge to each UE is constantly being reduced. The amount of energy (PE) in the accumulator is the product of the force (pressure) times the available volume. To have enough available volume for the work, the pressure must be high enough at the beginning for there to be enough energy in the gas to push the final UE out as the actuator completes its movement. This means from a practical standpoint that that there is much more energy stored in the prior art accumulator than will be used and that, to control the velocity, the excess energy must be dissipated as heat across an orifice.

FIG. 16A provides a conventional pneumatic circuit without the advantage of a VDPC implementation. In this conventional circuit a cylinder 1610 is provided as a load and the potential energy required to support this work in moving this load must be stored in the accumulator 1602. The directional control module 1604 provides a hold position 1620 and a moving position 1630. For this system the compressed gas will push the liquid to move the cylinder in one direction and on the cylinder's return path the excess energy must be expended as heat though the orifice 1606.

In the embodiment implementation using a VDPC as disclosed in the present application, however, a VDPC can be used as both a pressure reducer and a pressure intensifier to make the greatest use of the stored energy. When the gas pressure drops below the required actuator pressure, the VDPC is switched from reducing to intensifying by means of the selector valve 1650 which receives a pressure indication from the pressure meter 1660.

This embodiment makes it possible to save energy and component cost in at least two other ways: Some systems have varying power requirements but without enough dwell time to justify the use of an accumulator. In these cases, the average load can be determined and a pump that is designed to efficiently convey that average power can be used in conjunction with an accumulator. Both the accumulator and the pump will operate at the most efficient power density and the VDPC 500 can reconfigure the power density needed for the system without the use of restrictive orifices.

Figure 17A:
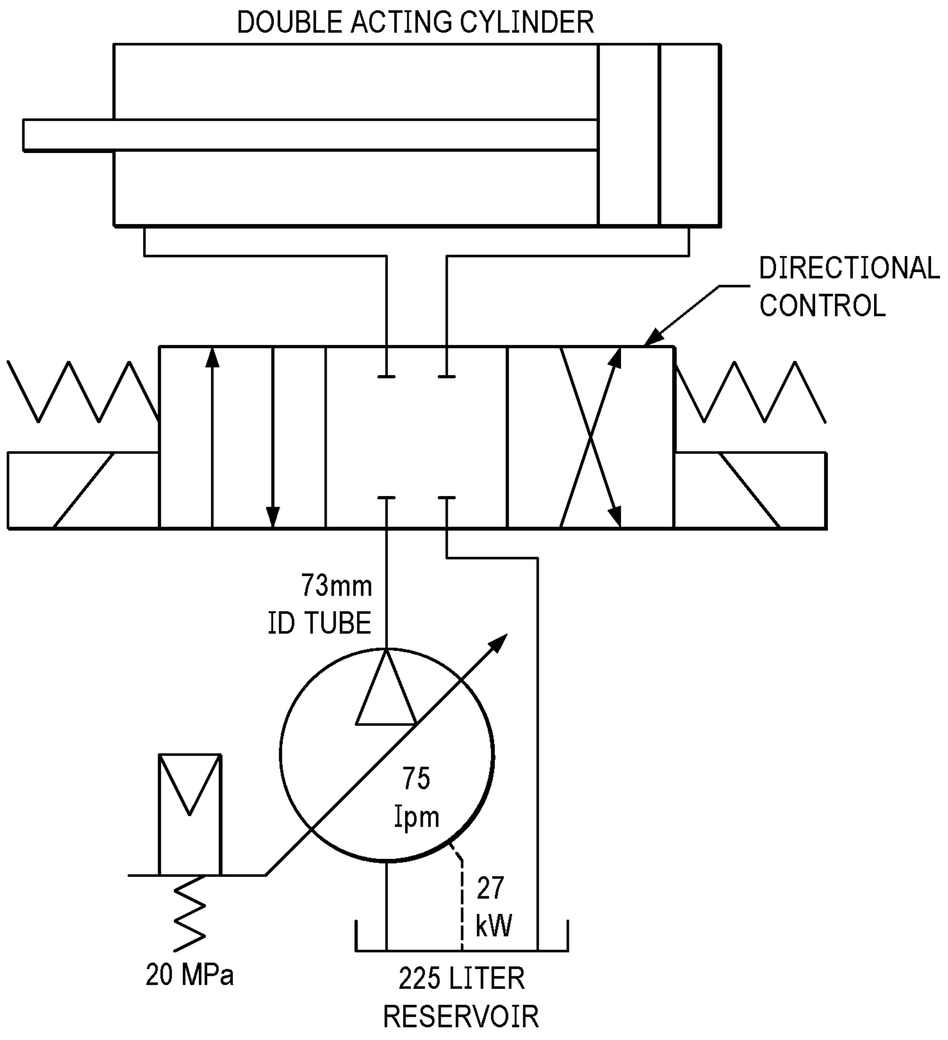
FIGS. 17A-17B are prior art and present embodiment illustrations demonstrating improved applications of stored energy systems.

Referring now to FIGS. 17A-17B, again an improved VDPC system in FIG. 17B is shown favorably contrasting to the conventional system illustrated in FIG. 17A. Suppose in the conventional system shown in FIG. 17A a pump that operates at 75 Ipm at 21 MPa for one minute and then drops to 38 Ipm at 12 MPa for one minute requires units of power (UP) that average ((75 Ipm×21 MPa)+(38 Ipm+12 MPa))÷2, which equals 1016 UP. The system needs an average of 1016 UP to operate. Using an efficient pump running continually at 35 MPa, this amount of energy can be provided at about 30 Ipm.

Figure 17B:
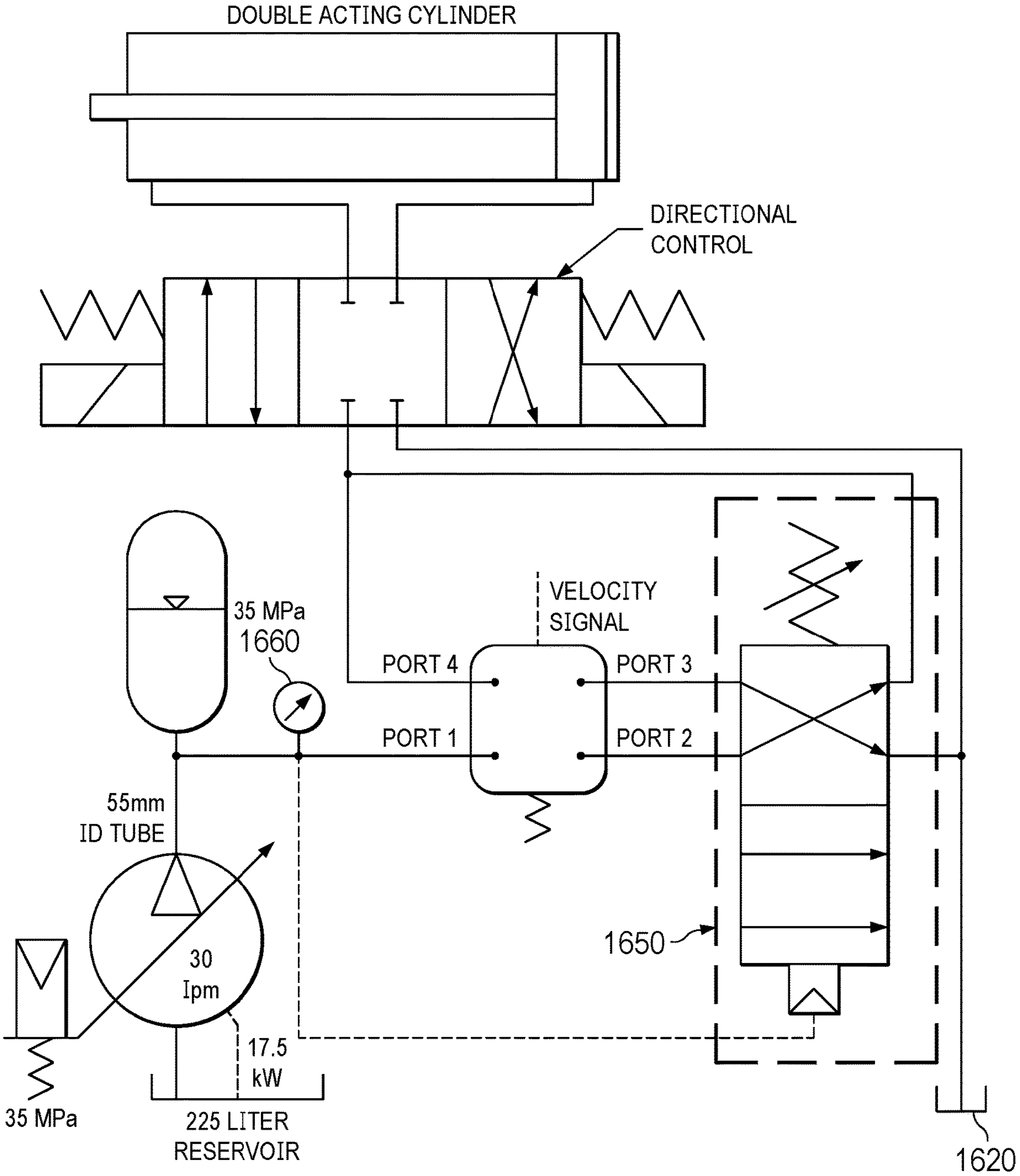

In the improved system of FIG. 17B, this same 30 Ipm could be provided of pumping would be continuously provided at 30 Ipm at 35 MPa and be continually driven by a supply of 17.5 kW. The VDPC could be used to convert the power as needed, and the pump and power supply would be operating at maximized efficiency. This would also reduce the necessary reservoir volume and allow for smaller and lighter plumbing. Again, these example systems would allow a 25%, 35%, or 50% in many of the operating parameters. For example, the power supply requirements are reduced by approximately 35% in this context and the tubing and reservoir sizes could be reduced by approximately 25% and 42% respectively. The FIG. 17B implementation would use a VDPC as both a pressure reducer and a pressure intensifier to make the greatest use of the stored energy. When the gas pressure from the accumulator drops below the required actuator pressure, the VDPC 500 would then be switched from reducing to intensifying by means of the selector valve 1650 which receives a pressure indication from the pressure meter 1660.

Multiple Actuator Implementations

A major advantage of fluid power is the ability to have a central power source and then distribute that power to multiple locations and produce both rotary and linear motion. In the prior art, when a single pump is used to supply the fluid, it must be sized for maximum system flow and pressure. When more than one actuator is being operated, the pump must move the fluid at the maximum required pressure and any excess energy must be dissipated. A conventional way to mitigate this is by providing each actuator with its own pump, all driven by a common prime mover. This approach has several limitations as the number of actuators increases. For example, there are only so many pumps that can be mounted on a prime mover and these all add weight and take up valuable space. With single or multiple pumps, there is still the need for restrictive orifices to consume energy and control velocity.

Another method of reducing the energy loss in the prior art is to provide a separate small power unit for each actuator. This also has its limitations as it increases weight and complexity with the addition of the necessary electronic controls. The actuators must be designed to incorporate the power units, and this makes it impractical for retrofitting to an existing system with a central power unit.

This present patent application describes a VDPC-facilitated multiple actuator system that mitigates the above-described disadvantages of conventional approaches and provides the following advantages:

1. A single pump can be used that can operate at its most efficient pressure and flow regardless of the actuator requirements.
2. Each actuator draws only the $U_P$ necessary for the immediate work.
3. It is easy to retrofit an existing piece of equipment.
4. A smaller reservoir can be used to accommodate the smaller pump.
5. There is less heat to dissipate without the restrictive orifices.
6. The equipment may be able to operate with a smaller prime mover.

Figure 18:
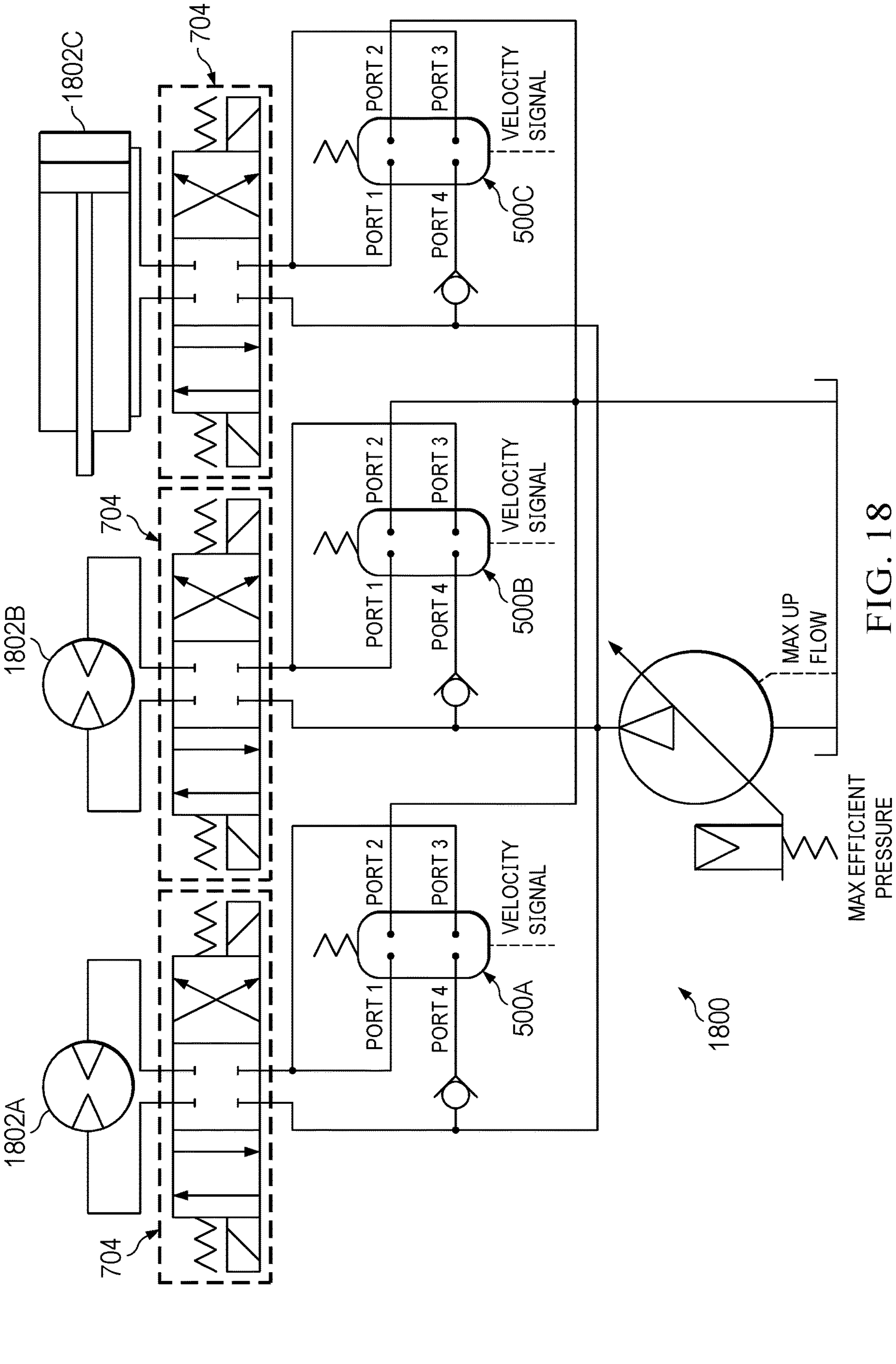
FIG. 18 is an illustration of embodiment approach for using several VDPCs to drive multiple actuators in a multiple actuator system.

FIG. 18 provides an exemplary VDPC-implemented approach of a multiple actuator system 1800. In this approach, a VDPC 500*a*, 500*b*, 500*c* is provided for each actuator 1802*a*, 1802*b*, 1802*c*, where each VDPC 500*a-c* can provide control independent control of its respective actuator 1802*a-c* in accordance with the principles described herein and without the disadvantages described above relative to known multiple actuator fluid power systems. The various embodiments described herein individually can be applied to each of these actuator systems 1802*a-c* according to design needs and in fact can be mixed-and-matched according to the needs of each actuator (e.g., any of the implementations of FIGS. 7-14 could be implemented for the individual actuators 1802*a-c*).

Pneumatics

There is a difference between gas and liquid and this difference changes the way we apply the VDPC. When a gas is compressed, it becomes heated. This heat accounts for about 10% of the available UE's. The heat is usually dissipated as the gas moves through the piping and as it rests in the receiver. The amount of heat energy generated and then lost is directly proportional to the compression ratio.

In both hydraulics and pneumatics, energy units (UE's) are produced and stored at a higher pressure than is needed for the work to be done. There is very little compressibility with liquids and the standard method in hydraulics is to control the excess energy by squeezing of the pressure through an orifice. A gas is compressible and the amount of energy in the system is directly proportional to the quantity of gas molecules under compression. The power to an actuator can be controlled by a regulator which limits the quantity of molecules that are released. Pressure is the result of molecular density. The regulator reduces the density which results in a lower pressure but without the energy loss. But a regulator has no ability to increase molecular density. The compressor must supply the molecular density that meets the highest pressure requirement in the system and then depend on the regulator(s) to limit the pressure to the actuators.

It takes a higher energy density to accelerate a load than to maintain velocity. The regulator must be set at a molecular density high enough to accelerate the actuator. But to control velocity, restrictive orifices must be applied to limit the rate at which the molecules are used.

A VDPC can reduce the energy losses in pneumatic systems in two ways. The $P_E$ stored in the receiver is the product of volume and pressure. The compressor can be operated at a relatively low pressure which will increase its efficiency and reduce the energy lost as heat. Low pressure also reduces the air lost through leakage throughout the system. The VDPC can then function as a pressure intensifier for those actuators that require a greater power density. The VDPC is then used as velocity control at the actuator to use only the energy needed for the job. This is illustrated in the circuit on the left.

Referring now to FIGS. 19A, 19B, 19C, and 19D, several cross sections of an illustration of a physical embodiment 4-port VDPC 500. Note that there are many different physical structures that can implement a VDPC in accordance with the principles disclosed in the present document and this presently disclosed physical embodiment is provided to help illustrate the general principles described and claimed with the present application and any future patent issuance, continuance, reissues, or reexaminations issuing and claiming priority to this application, directly or indirectly.

Figure 19A:
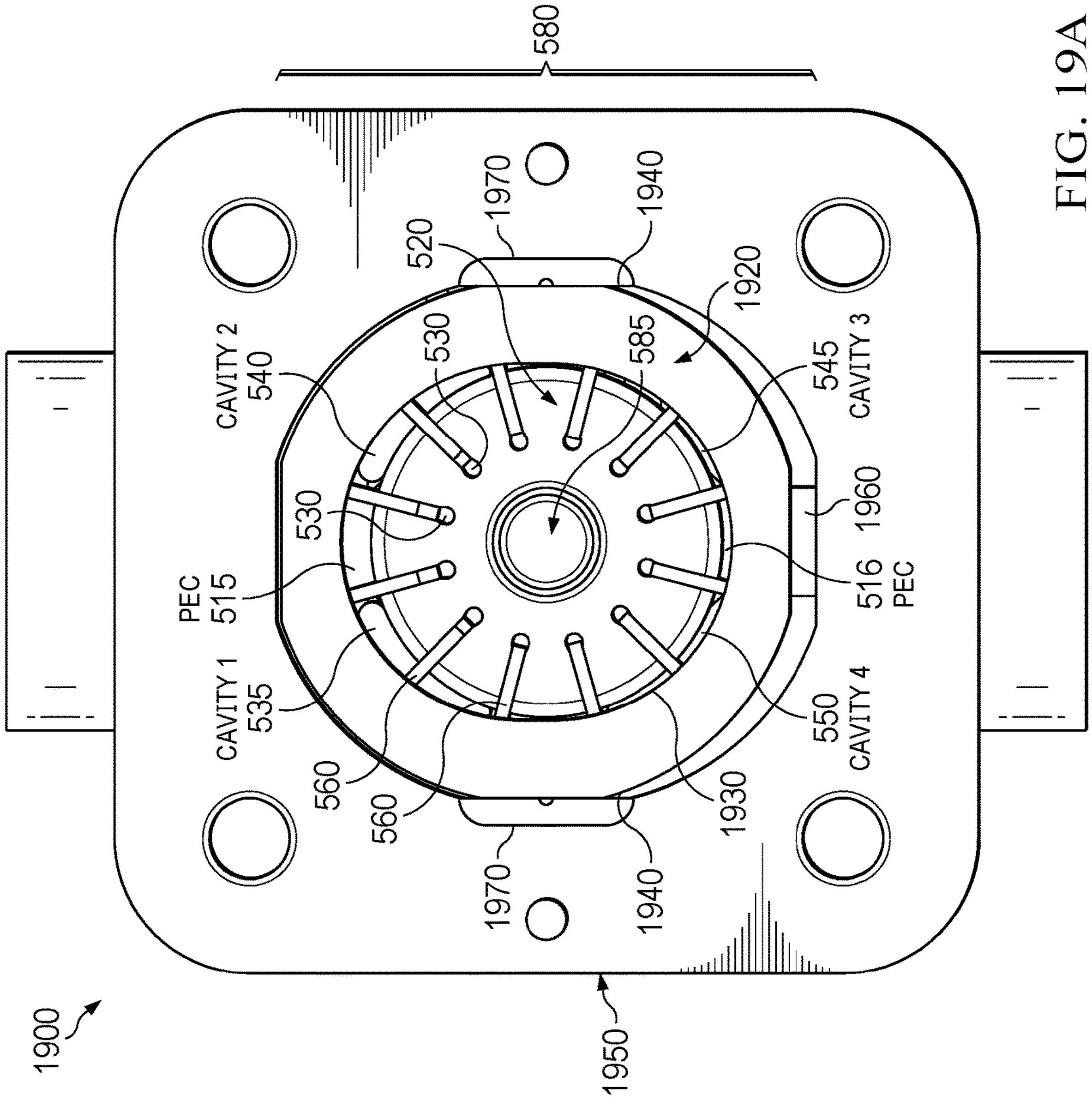
FIGS. 19A-D provide illustrations of embodiments of mechanical implementations of a vane-based VDPC.
Figure 19B:
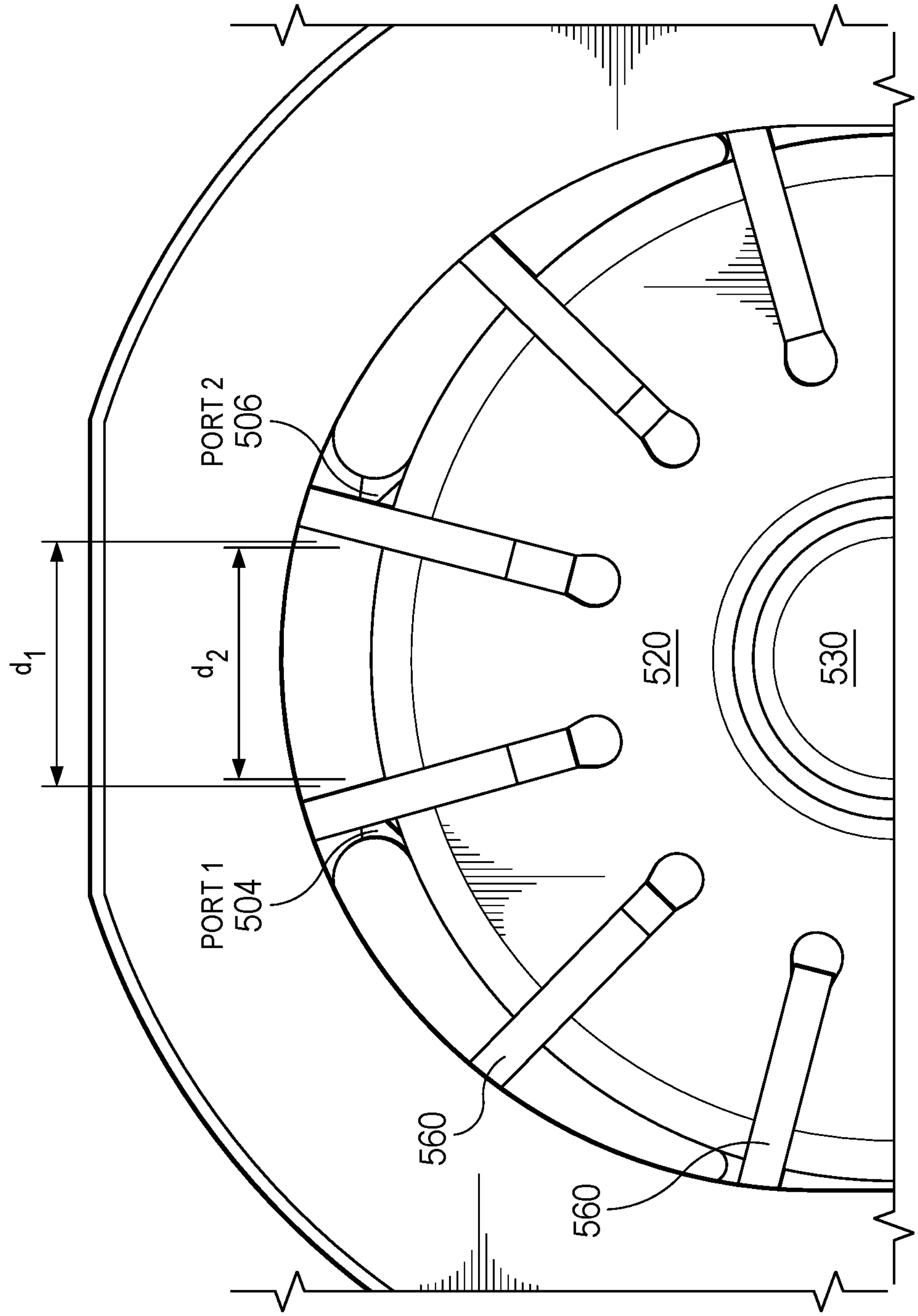

Referring specifically now to FIG. 19A, illustrated is a VDPC having four ports, although the ports themselves are not specifically illustrated in this cross-section (see FIG. 19B). This implementation illustrates a cam 1920. There is a rotor 520 with 12 vane slots 530 and 12 corresponding vanes 560 that rotates around a shaft 585 within the cam 1920, and collectively the cam, rotor, and vanes form a rotating group 580.

In this present embodiment, the rotor 520 is generally circular and rotates within the cam 1920, with the interior space of the cam defining a power exchange cavity 515 and 516 within which the rotor 520 rotates and engages with an inner wall 1930 of the cam 1920 through the vanes 560. Pressure within the vane slots 530 keep the vanes 560 engaged by spring tension and/or pressurizing the vane slots 530 internally or externally to maintain contact with the power exchange cavities 515 and 516.

The cam 1920 itself has flat sides 1970 that are slidably movable along inner flat sides 1940 of an outer casing 1950. In this embodiment, the the rotor 520 is rotatably concentric to the shaft 585, and thus movement of the cam 1920 is relative to the outer casing 1950 causes translation of the relative positions of the cam 1920 to the power exchange cavities 515 and 516 formed in the inside of the cam 1920. In this illustrated figure, and for purposes of discussion only, this translation would be in the "y" axis direction.

The movement of the cam 1920 relative to the rotor 520 may be imparted by pistons 1960 that engage with flat portions 1970 of the housing 1920 to control the variability of the four chambers 535, 540, 545, 550. Illustrated in the present FIG. 19A, only the bottom piston 1960 is shown, although generally there would be an opposing piston on the outside opposing side of the cam 1920, and in this embodiment that opposing piston 1960 can be seen in FIG. 19D. This relative movement causes the relative sizes of the cavities 535, 540, 545, 550, and more specifically Cavity 1 535 and Cavity 2 540 are substantially identically sized in this embodiment and they change together in size with the movement up and down of the cam 1920 relative to the rotor 520, while Cavity 3 545 and Cavity 4 550 are also substantially identically sized and change together as well. As Cavities 1 and 2 grow larger, Cavities 3 and 4 grow smaller.

As described above, the ports can be flexibly configured such that a source of fluid might, e.g., enter Cavity 1 535 through a first port and push the fluid over to Cavity 2 540 and out a second port, turning the rotor 530 by the vanes 560. This rotation of the rotor 520 and vanes 560 in turn can provide a pumping action to pull fluid from another source into Cavity 3 545 and over to Cavity 4 550 and out through a fourth port. As mentioned, the corresponding ports will be further described in subsequent figures relating to this embodiment.

One design attribute of this embodiment is to provide that the intra-vane distance is substantially equal to than the distance between the ports. FIG. 19B, which is an inset view of FIG. 19A, shows this design principle. In particular, the distance d1, which is the distance from the end of Cavity 1 and the beginning of Cavity 2 is slightly less than the distance d2 between the inside edges of the two vanes. The system of this embodiment is designed to avoid any bleed-over that would result from the distance d1 being less than the intra-port distance d2 (applying this to all vane distances and the distances between all 4 cavities.

Figure 19C:
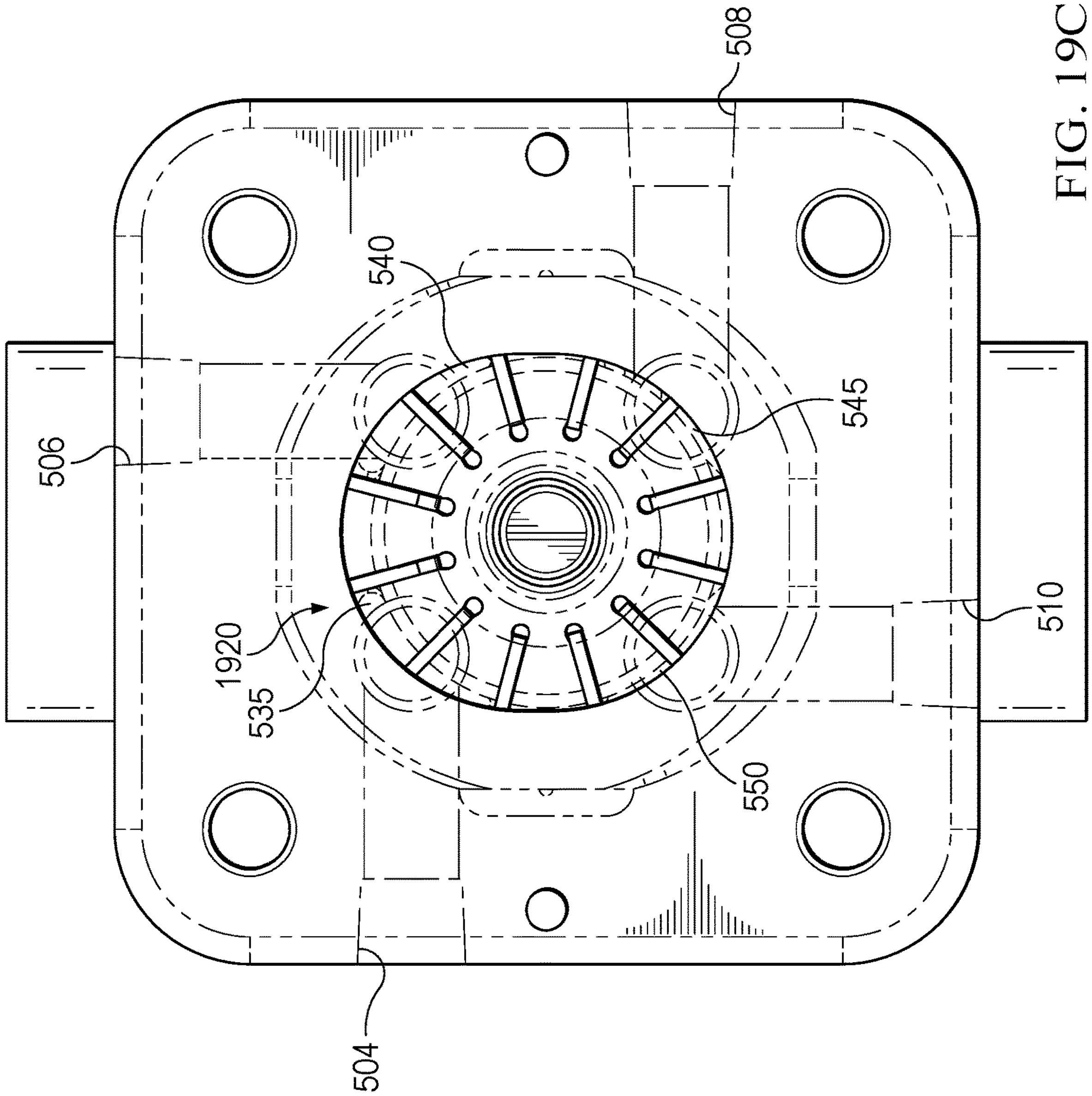

FIG. 19C shows the embodiment of FIGS. 19A-B, but it shows it at a different cross section in a way that illustrates the ports 504, 506, 508, 510 more fully. It also shows that the rotor vane assembly 520/560 has rotated partially. Various reference numbers have not been repeated in their representation of this figure as the same elements are represented by the same reference numbers as in FIGS. 19A-B.

Figure 19D:
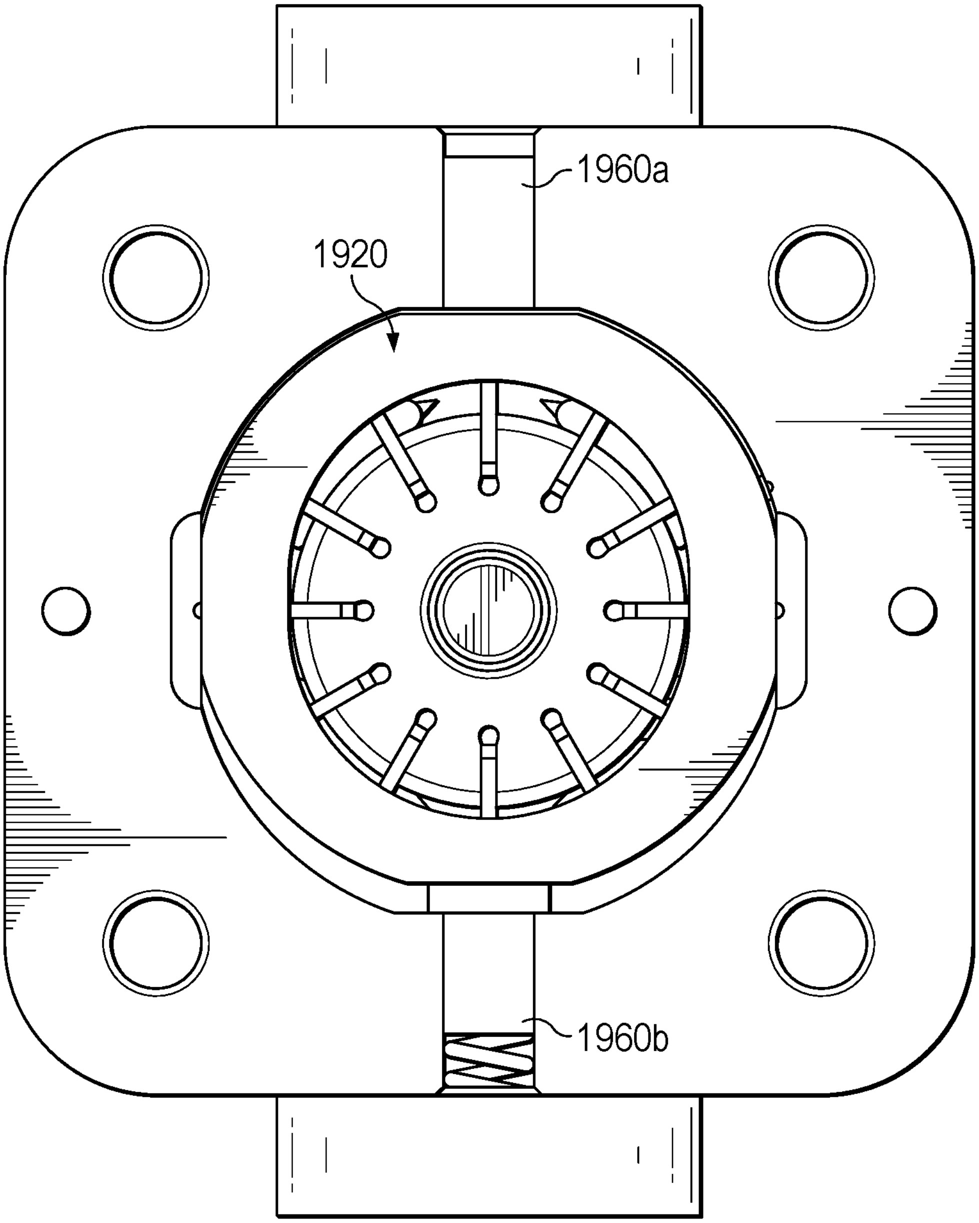

FIG. 19D provides one more view of this assembly and it shows more completely the pistons 1960 that translate the rotor/cam/vane assembly 520/530/560 relative to the housing 1920. In this instance the "top" piston 1960*a* is pushed down by hydraulic or pneumatic pressure whereas the "bottom" piston 1960*b* is pushed up by a spring that counterbalances the hydraulic or pneumatic pressure on the top piston 1960*a*. The position of the housing is accordingly controlled by the pressure on the "top" piston 1960*a*. As discussed, there are many ways that this control can be effected, be it a gear, a piston, fluid pressure, solenoid, or any other type of mechanical, fluid, or electromechanical control.

In one embodiment, the embodiment for a four-port variable displacement power controller as shown in FIGS. 19A-19D envisions at least 8 vanes 560 equally spaced about the body 1950. And in another present embodiment for a four-port variable displacement power controller as shown in FIGS. 19A-19D, there are at least 12 vanes 560 equally spaced about the rotor 520 radially about the centerline of the body 1950.

Figure 20:
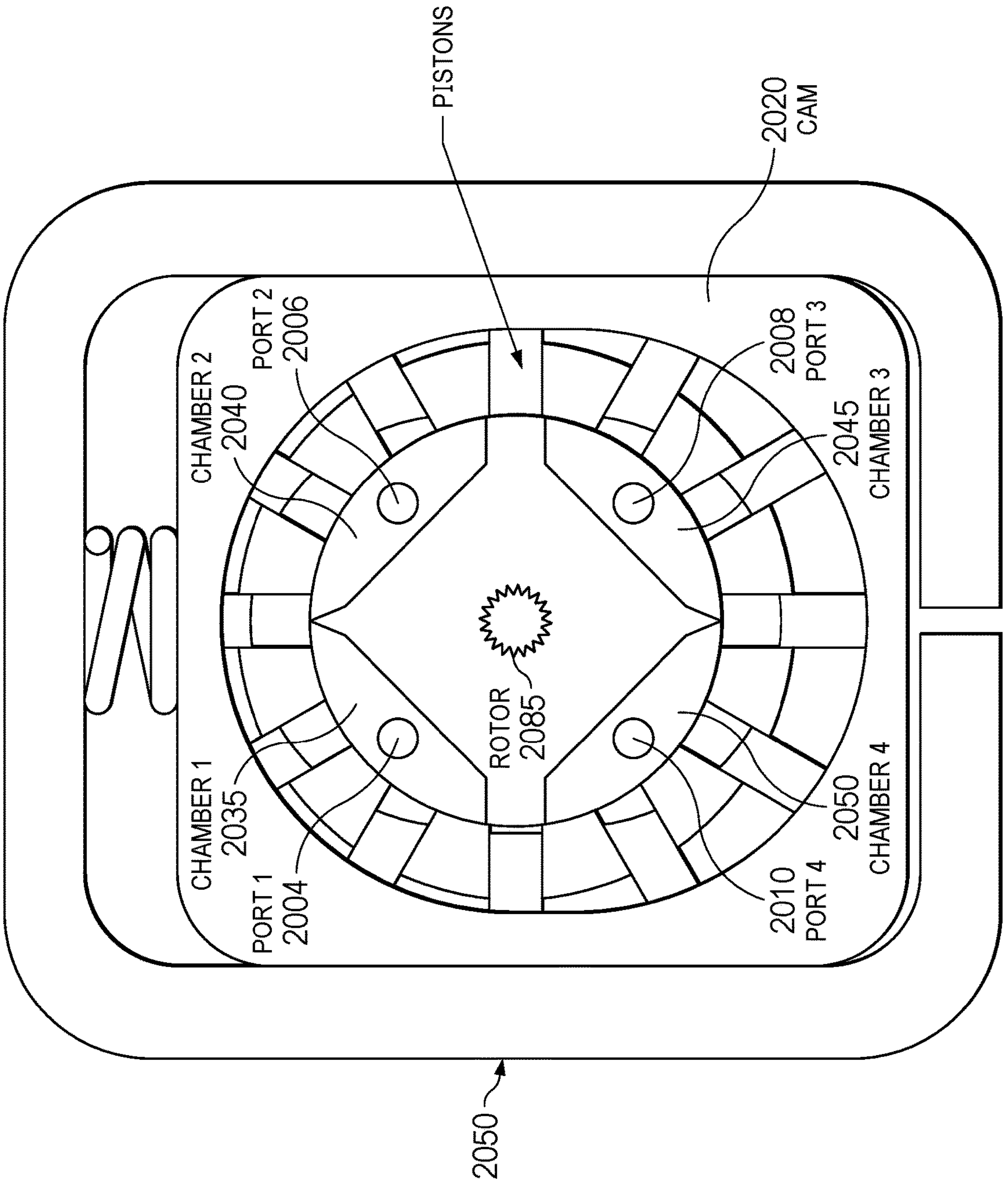
FIG. 20 is an illustration of an embodiment using a piston/cylinder block implementation of a VDPC.

While many of the embodiments described herein are rotor/vane embodiments where vanes rotate inside cams to move fluids or gases through liquid passages, the present application anticipates that the principles disclosed herein can be applied to a piston unit approach. FIG. 20 described below provides an illustration of an embodiment of this approach as applied to a four-port system.

As shown in FIG. 20, an outer housing 2050 is provided that contains the cam which can be translationally shifted (up or down relative to the perspective of this figure) through mechanisms that have been previously described in other embodiments of this application. In this implementation, Port 1 2004, Port 2 2006, Port 3 2008 and Port 4 2010 are provided to pass fluids into Chambers 1-4 2035, 2040, 2045, 2050 as has been previously described. The rotor 2085 is positioned and rotates within the within cam 2020, and the relative volumes of the Chamber 1-2 pair 2035, 2040 relative to the Chamber 3-4 pair 2045, 2050 can be adjusted by the translation of the cam 2020 relative to the rotor 2085. The same modulation of the respective chamber pairs can accordingly allow this VDPC assembly 2000 to perform the tasks of the VDPC assemblies used in the various application embodiments such as those described in FIGS. 7-18 herein.

Illustrated in FIG. 21A-D are embodiments of mechanical implementations of a piston unit VDPC 2100. In these implementations, rather than using vane-based rotors that form fluid chambers or cavities between the rotor and cam, there are defined fluid cavities or chambers within the rotor 2085 whose volumes are defined by pistons 2185 that are depressed or elongated by translational movement of the cam 2120. These features are further described hereinbelow.

Figure 21A:
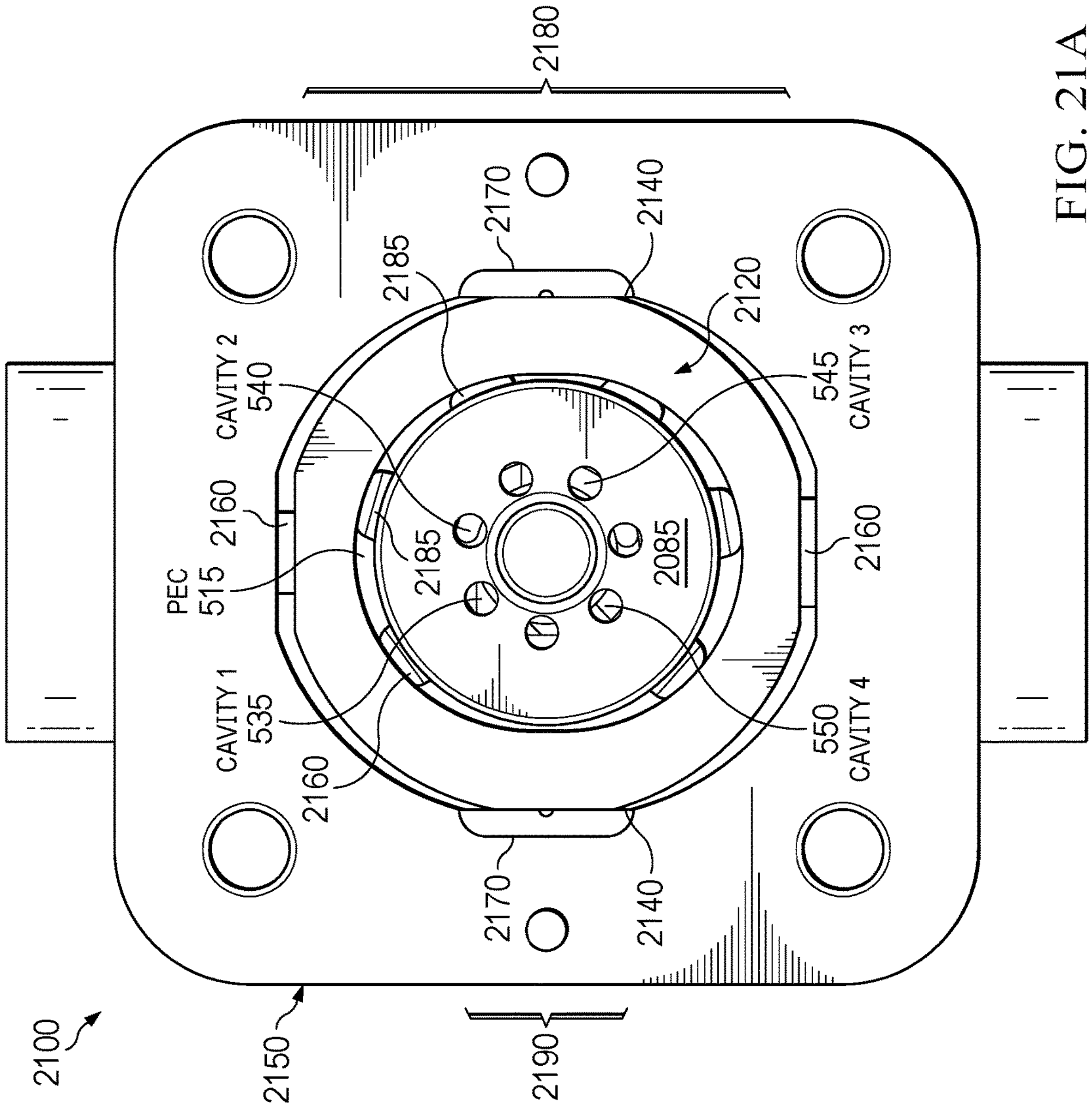
FIGS. 21A-D provide illustrations of embodiments of mechanical implementations of a piston VDPC.

FIG. 21A provides an illustration of a mechanical implementation of a rotor/cylinder block VDPC 2100. This embodiment implementation includes four cavities—Cavity 1 535, Cavity 2 540, Cavity 3 545 and Cavity 4 550, but unlike the vane-based implementations described in some of the embodiments above, the adapted volume of the cavities according to the pistons 2185 that are slidably mounted in cylinder bores in the rotor 2085 are what define the respective volumes of the cavities, where the pistons 2185 slide in and out depending upon the movement of the cam ring 2120 by translation along the straight-walled section 2190 of the housing 2150.

As disclosed above with respect to other embodiments, in this implementation the cam ring 2120 has translational freedom of motion in the "y" axis direction of the page as shown in the present figure as the flat portion 2170 moves along the flat portion of the housing 2170 along the straight-walled section 2190. The translational pistons 2160 (as distinguished from the cavity pistons 2185) can be controlled and actuated as described in prior embodiments to accomplish the expansion and contractions of the cavities and of the first and second cavity pairs 535-540 and 545-550. With the adjustable ratios between the first and second cavity pairs, this VDPC can be used in the various system application that have been described herein, as well as in other system applications that flow from the properties of this rotor/cylinder block implementation 2100. Collectively the rotor 2085 and rotor pistons 2185 form a rotational group 2180.

Figure 21B:
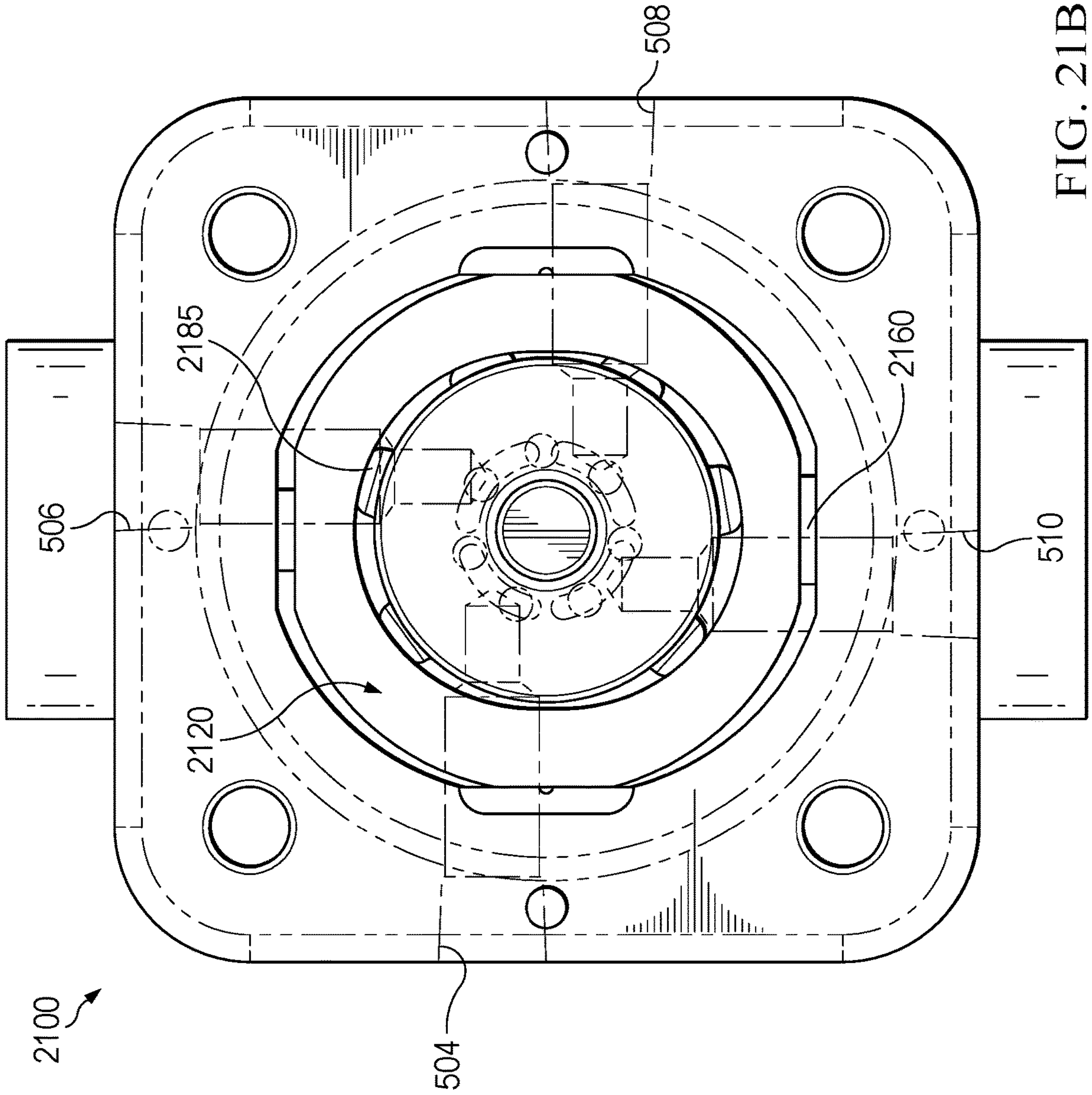

FIG. 21B shows the embodiment of FIG. 21A, but it shows it at a different cross section in a way that illustrates the ports 504, 506, 508, 510 more fully. It also shows that the piston rotating assembly 2180. Various reference numbers have not been repeated in their representation of this figure as the same elements are represented by the same reference numbers as in FIG. 21A.

Figure 21C:
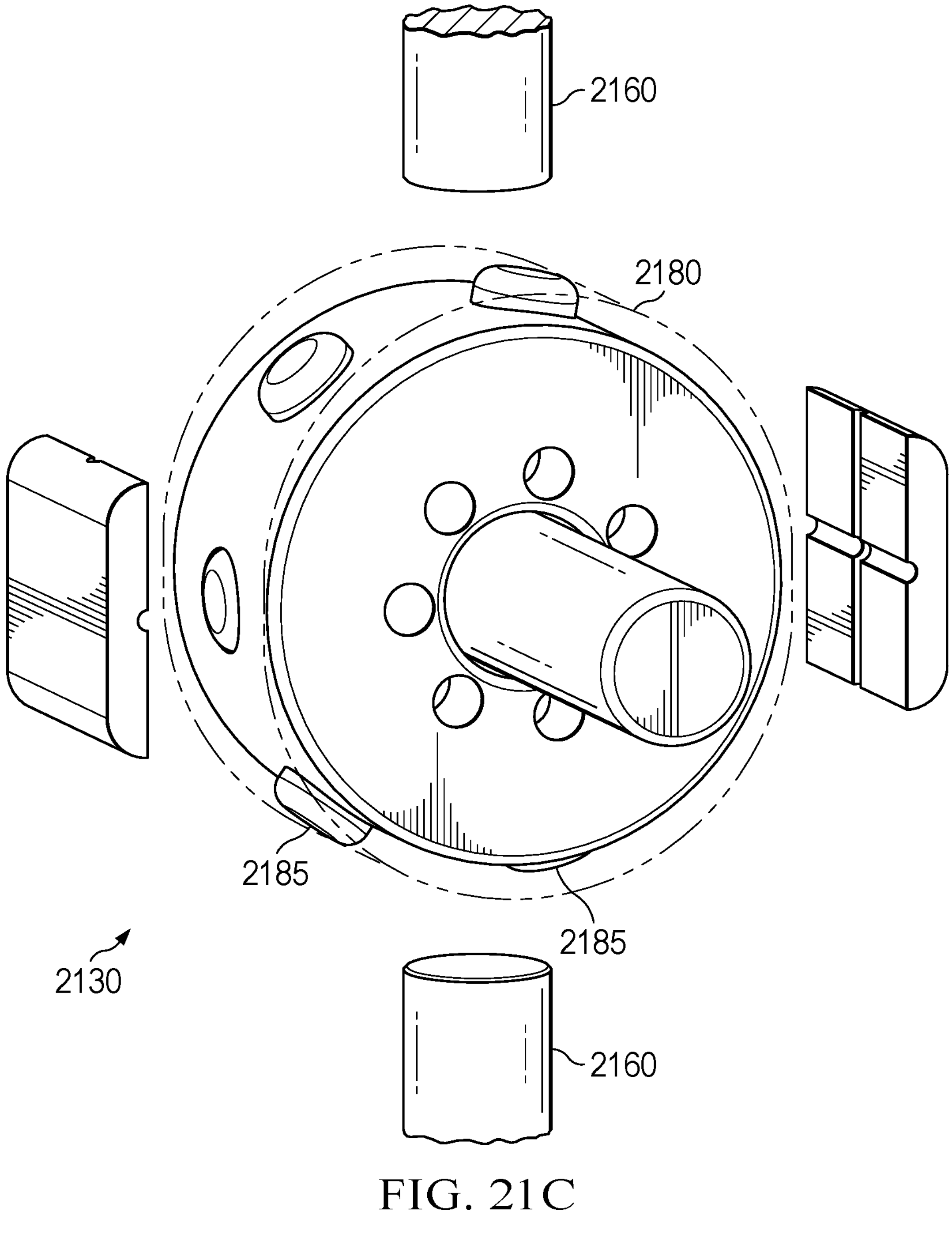

FIG. 21C shows an exposed view of just the piston rotating assembly 2180 and the stroking pistons 2160 for the cam ring 2120

Figure 21D:
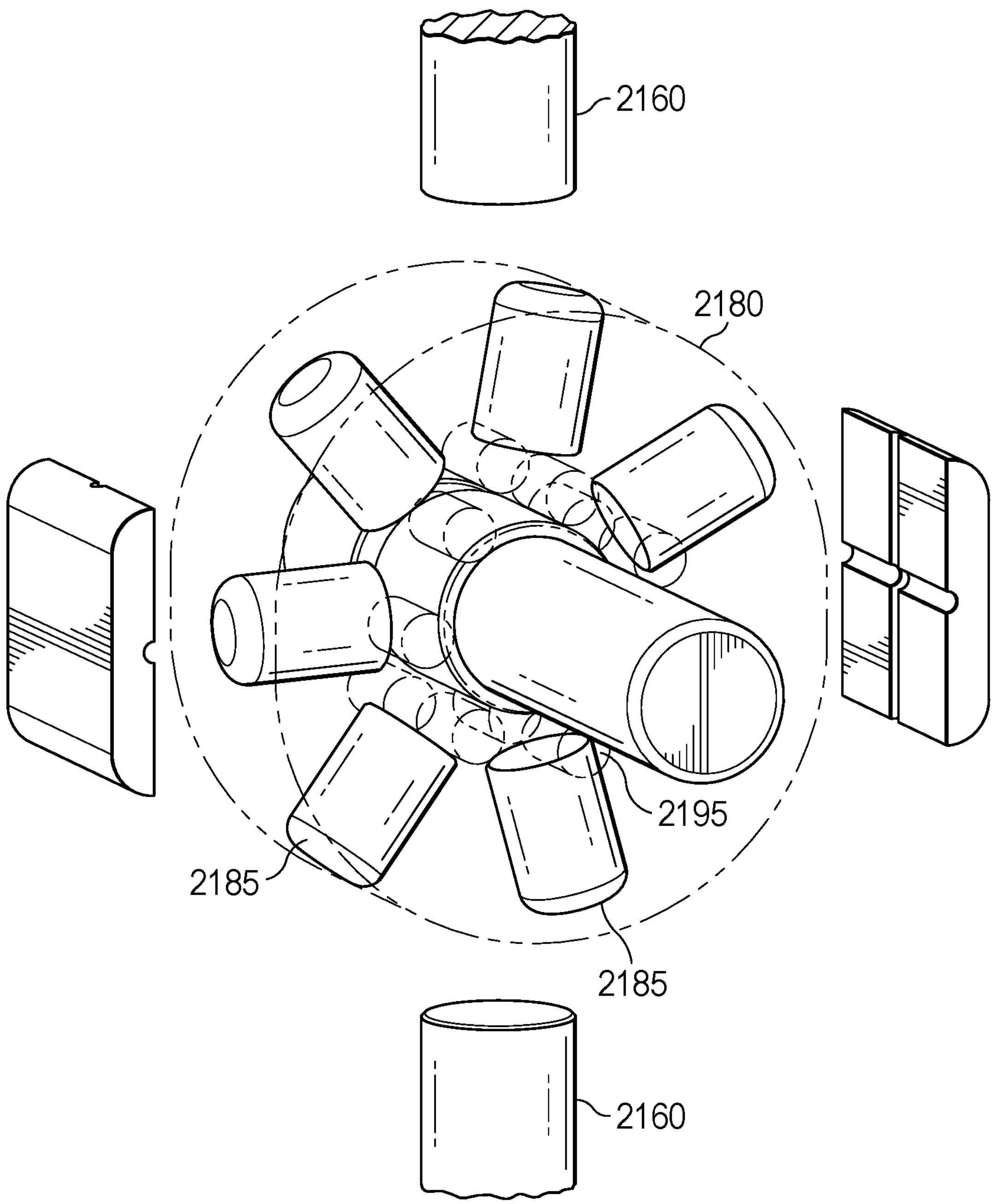

FIG. 21D provides an additional perspective sectional view of the rotor/cylinder block embodiment 2100. Of particular note, this perspective sectional view illustrates that the cavity-defining pistons 2185 that also have a depth 2195 that further defines the respective cavity volumes as the rotor rotates these pistons through the several cavities 535, 540, 545, 550.

Figure 22A:
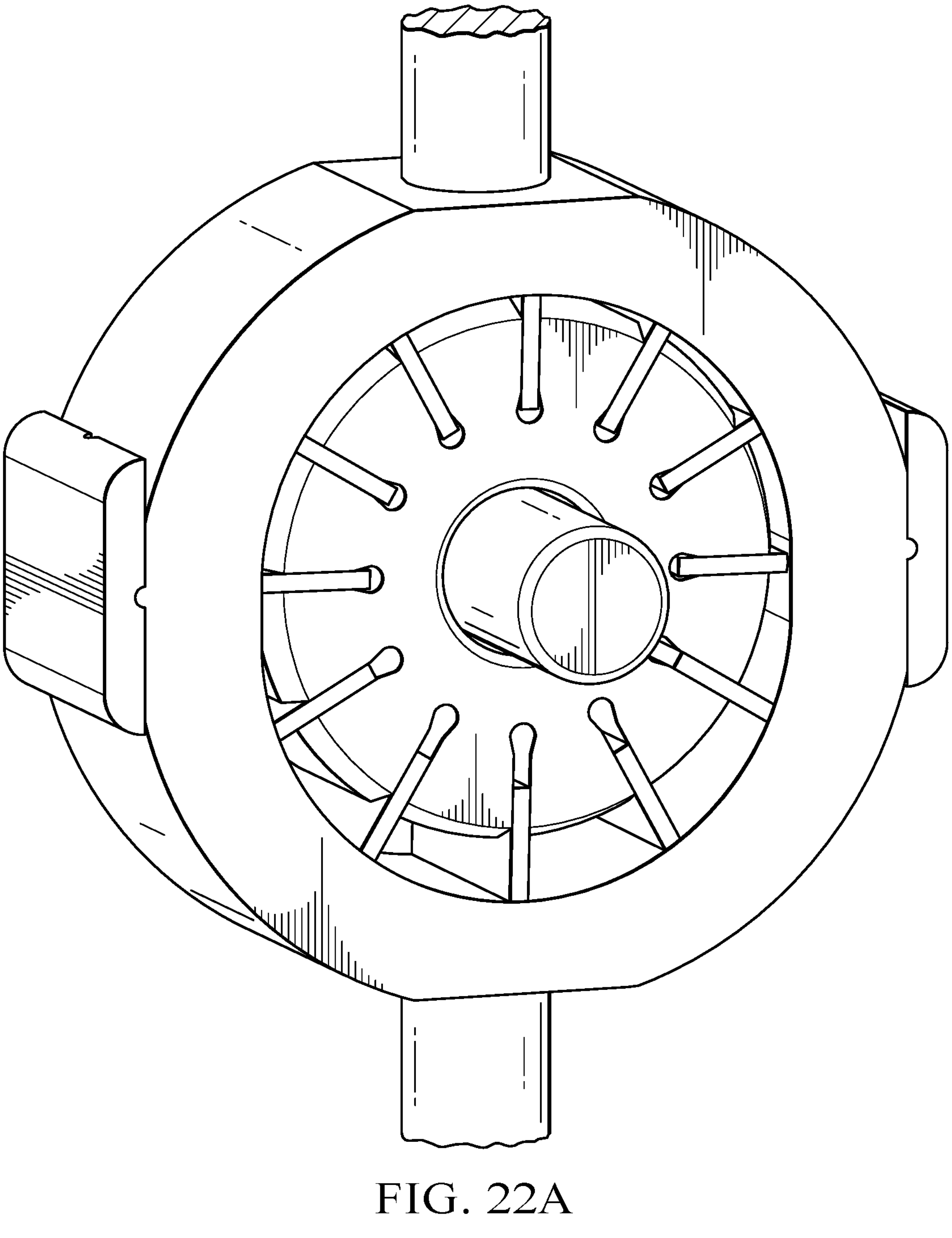
FIGS. 22A-B provide illustrations of embodiments of a vane style VDPC 22A and a piston style VDPC 22B.
Figure 22B:
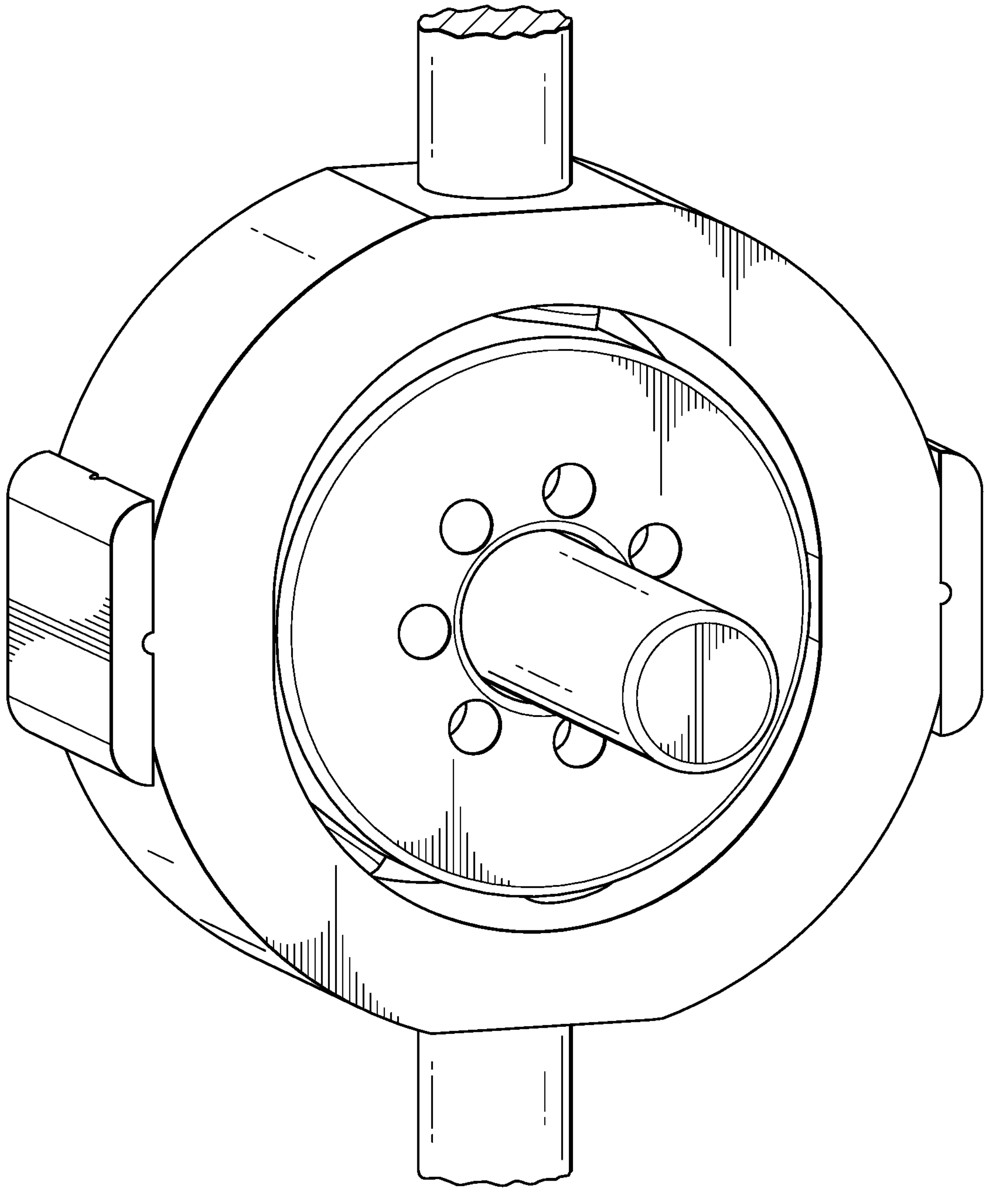

FIG. 22A-B provides a look at the complete rotating assemblies. As shown in FIG. 22A a complete vane rotating assembly. As shown in FIG. 22B a complete piston rotating assembly.

Summary Comments

The concept of the Variable Displacement Power Control (VDPC) is to recognize fluid energy as a product of pressure and volume (pV). The amount of energy stored as potential energy ($P_E$) or used as kinetic energy ($K_E$) can be expressed as energy units ($U_E$'s). The available energy can be in the form of high pressure/low volume $U_E$'s or low pressure/high volume $U_E$'s. VDPCs make it possible to produce the energy in the most practical and efficient way and then convert or reconfigure the $U_E$'s to whatever is needed for the work to be done. When the $U_E$'s are stored or supplied at a pressure higher than is required by the load, the VDPC will reconfigure them into a lower pressure and increased volume. When the $U_E$'s exist at a pressure that is lower than what is required by the load, a VDPC will increase the pressure and reduce the volume. This provides the opportunity to produce energy at the most efficient level and then convert the energy into the most efficient form required for the work.

The VDPC embodiments described in the present patent application consider the total energy required for the work, designs for the most appropriate method of producing that energy, and then distributes the energy with an improved efficiency as describe herein.

Various terms used herein have special meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings may refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

We claim:

1. A displacement power controller for variable displacement fluid or gas power control, the displacement power controller having:

(a) a housing with at least four fluid exchange ports;

(b) a power conversion cavity in fluid communication with the at least four fluid exchange ports and having an inner surface;

(c) a cam adjustably positioned in the power conversion cavity, the cam being translationally movable within the power exchange cavity;

(d) a rotor within the cam, the rotor having an axis of rotation and at least four vane slots;

(e) a plurality of vanes slidably movable within the at least four vane slots, the vanes provided under outward radial pressure to maintain contact with an inner wall of the cam, (f) wherein the cam, the rotor and the vanes collectively act as a power conversion assembly, whereby the power transfer conversion assembly forms at least four fluid cavities between itself and the inner surface of the power conversion cavity, each fluid cavity associated with a respective fluid exchange port;

(g) whereby the power transfer conversion assembly through rotation of the rotor and the plurality of vanes within the cam forms at least first and second fluid paths, the first fluid path being formed as fluidly connecting first and second fluid exchange ports of the at least four fluid exchange ports and the second fluid path being formed as fluidly connecting third and fourth fluid exchange ports of the at least four fluid exchange ports, and wherein the first fluid path is comprised of first and second fluid cavities of the at least four fluid cavities associated with the respective first and second fluid exchange ports, and wherein the second fluid path is comprised of third and fourth fluid cavities of the at least four fluid cavities associated with the respective third and fourth fluid exchange ports;

(h) and whereby fluid volumes of the first and second fluid paths relative to each other are proportionately adjustable via relative motion between the rotor and the cam, wherein as the fluid volume of one of the first and second fluid paths is increased, the fluid volume of the other of the first and second fluid paths is proportionately decreased.

2. The displacement power controller of claim 1, wherein the cam is non-rotational.

3. The displacement power controller of claim 1, wherein the cam has a geometry to support four chambers.

4. The displacement power controller of claim 1 wherein the displacement power controller is adapted for fluid or hydraulic applications.

5. The displacement controller of claim 1 wherein the variable displacement controller is adapted for gas or pneumatic applications.

6. A displacement power controller for variable displacement fluid or gas power control, the displacement power controller having:

(a) a housing with at least four fluid exchange ports;

(b) a power conversion cavity in fluid communication with the at least four fluid exchange ports and having an inner surface;

(c) a movable member adjustably positioned in the power exchange cavity, the movable member being translationally movable within the power conversion cavity;

(d) a cylinder block assembly in mechanical engagement with the movable member, the cylinder block assembly having an axis of rotation, least four piston bores, and a plurality of pistons slidably movable within the at least four piston bores provided under pressure to maintain contact with the movable member, the movable member and cylinder block assembly collectively acting as a power transfer assembly;

(e) whereby the power transfer assembly forms first and second pairs of chambers within the power conversion cavity, the first pair of chambers forming a first fluid connection between first and second ports of the four fluid exchange ports and the second pair of chambers forming a second fluid connection between third and fourth ports of the four fluid exchange ports, and whereby the power transfer assembly is adjustable via relative motion between the cylinder block and movable member, whereby the relative motion proportionately adjusts the relative volume of the first and second pairs of chambers, wherein as the fluid volume of one of the first and second pairs of chambers is increased, the fluid volume of the other of the first and second pairs of chambers is proportionately decreased.

7. The displacement power controller of claim 6, wherein the movable member is a cam.

8. The displacement power controller of claim 7, wherein the cam has a geometry to support at least four chambers.

9. The displacement power controller of claim 6 wherein the variable displacement controller is adapted for fluid or hydraulic applications.

10. The displacement controller of claim 6 wherein the variable displacement controller is adapted for gas or pneumatic applications.

11. A fluid system for controlling an actuator, the system comprising:

(a) a fluid source that provides a fluid source flow under pressure;

(b) an actuator that performs work in the system using an input fluid flow; and (c) a rotational displacement power controller for variable displacement of fluid or gas power control, wherein (1) the rotational displacement power controller is operable to receive the fluid source flow under pressure from the fluid source and to modulate the fluid source flow into an adapted fluid flow to be provided as the input fluid flow for the actuator, (2) the rotational displacement power controller further comprises at least four ports, at least one of the at least four ports being connected to receive or augment the fluid source flow, at least one of the at least four ports being connected to provide the input fluid flow to or receive fluid flow from the actuator, and at least two additional ports of the at least four ports being connected to receive or discharge fluid, (3) the rotational displacement power controller defines a first fluid path between a first two of the at least four ports and a second fluid path between a second two of the at least four ports;

(4) the rotational displacement power controller defines four cavities, whereby two cavities are defined along each of the first and second fluid paths, thereby defining a first pair of cavities along the first fluid path and a second pair of cavities along a second fluid path;

(5) the rotational displacement power controller includes a translational mechanism by which fluid volumes of the respective first and second pairs of cavities can be adjusted relative to each other to define a fluid volume ratio between the first pair and second pair of cavities;

(6) whereby the rotational displacement power controller can modulate the input fluid flow to or from the actuator by transforming the fluid flow while preserving energy in the system by modulating the fluid volume ratio between the first and second pairs of cavities.

12. The fluid system of claim 11 wherein the system is configured as a meter-in power control for an actuator.

13. The fluid system of claim 12 wherein the actuator is a hydraulic motor.

14. The fluid system of claim 12 wherein the actuator is a double acting hydraulic cylinder.

15. The fluid system of claim 11 wherein the system is configured as a power optimizer.

16. The fluid system of claim 11 wherein the system is configured as a counterbalance or brake relative to a load being pulled away from an actuator.

17. The fluid system of claim 11 wherein the system is configured as power combiner from two actuators.

18. The fluid system of claim 11 wherein the system is configured as power divider to supply power to two actuators.

19. The fluid system of claim 11 wherein the system is configured for velocity control of single acting cylinder.

* * * * *